US010563091B2

(12) United States Patent
Kikuchi

(10) Patent No.: US 10,563,091 B2
(45) Date of Patent: Feb. 18, 2020

(54) CURABLE COMPOSITION, AND MOULDED BODY

(71) Applicant: DAICEL CORPORATION, Osaka-shi, Osaka (JP)

(72) Inventor: Shinji Kikuchi, Himeji (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/736,383

(22) PCT Filed: Jun. 1, 2016

(86) PCT No.: PCT/JP2016/066255
§ 371 (c)(1),
(2) Date: Dec. 14, 2017

(87) PCT Pub. No.: WO2016/203957
PCT Pub. Date: Dec. 22, 2016

(65) Prior Publication Data
US 2018/0142128 A1    May 24, 2018

(30) Foreign Application Priority Data

Jun. 17, 2015 (JP) .................................. 2015-122343
Jun. 17, 2015 (JP) .................................. 2015-122345
Jun. 17, 2015 (JP) .................................. 2015-122350

(51) Int. Cl.
| | | |
|---|---|---|
| C09D 183/06 | (2006.01) | |
| C08G 77/14 | (2006.01) | |
| C08G 59/40 | (2006.01) | |
| C08L 33/14 | (2006.01) | |
| C08G 77/18 | (2006.01) | |
| C08J 7/04 | (2006.01) | |
| C08L 83/06 | (2006.01) | |
| C08G 77/38 | (2006.01) | |
| C09D 7/47 | (2018.01) | |

(52) U.S. Cl.
CPC ........... *C09D 183/06* (2013.01); *C08G 59/40* (2013.01); *C08G 59/4085* (2013.01); *C08G 77/14* (2013.01); *C08G 77/18* (2013.01); *C08G 77/38* (2013.01); *C08J 7/047* (2013.01); *C08L 33/14* (2013.01); *C08L 83/06* (2013.01); *C09D 7/47* (2018.01); *C08J 2383/08* (2013.01); *C08J 2433/14* (2013.01)

(58) Field of Classification Search
CPC ........ C09D 183/06; C09D 7/47; C08G 59/40; C08G 59/4085; C08G 77/14; C08G 59/38; C08G 77/18; C08G 77/38; C08J 7/047; C08L 33/14; C08L 83/06
See application file for complete search history.

(56) References Cited

U.S. PATENT DOCUMENTS

| | | |
|---|---|---|
| 6,132,882 A | 10/2000 | Landin et al. |
| 8,987,344 B2 | 3/2015 | Nakayama et al. |
| 9,233,495 B2 | 1/2016 | Kim et al. |
| 2009/0130157 A1 | 5/2009 | Ylitalo et al. |
| 2010/0029804 A1 | 2/2010 | Nakayama et al. |
| 2012/0168074 A1 | 7/2012 | Kim et al. |
| 2012/0219802 A1* | 8/2012 | Hilgers .................. C08G 18/44 428/412 |
| 2013/0331476 A1 | 12/2013 | Bae et al. |
| 2015/0093585 A1 | 4/2015 | Bae et al. |
| 2015/0159044 A1 | 6/2015 | Bae et al. |
| 2015/0275043 A1 | 10/2015 | Kikuchi et al. |
| 2016/0297933 A1 | 10/2016 | Kuwana et al. |

FOREIGN PATENT DOCUMENTS

| | | |
|---|---|---|
| CN | 101974227 A | 2/2011 |
| JP | 2008-248170 A | 10/2008 |
| JP | 2009-279840 A | 12/2009 |
| JP | 2010-515778 A | 5/2010 |
| JP | 2012-241118 A | 12/2012 |
| JP | 2013-516340 A | 5/2013 |
| JP | 2014-065172 A | 4/2014 |
| JP | 2015-107448 A | 6/2015 |
| JP | 2015-193747 A | 11/2015 |
| JP | 2015-212353 A | 11/2015 |

OTHER PUBLICATIONS

Machine translation of JP 2012-241118 (Year: 2012).*
English translation of International Preliminary Report on Patentability and Written Opinion dated Dec. 28, 2018, in PCT International Application No. PCT/JP2016/066255.
International Preliminary Report on Patentability and Written Opinion dated Sep. 6, 2016, in PCT International Application No. PCT/JP2016/066256, with English translation dated Dec. 28, 2017.
International Preliminary Report on Patentability and Written Opinion dated Sep. 6, 2016, in PCT International Application No. PCT/JP2016/066257, with English translation dated Dec. 28, 2017.
International Search Report dated Sep. 6, 2016, in PCT International Application No. PCT/JP2016/066256, with English translation.
International Search Report dated Sep. 6, 2016, in PCT International Application No. PCT/JP2016/066257, with English translation.

(Continued)

*Primary Examiner* — Edward J Cain
(74) *Attorney, Agent, or Firm* — Birch, Stewart, Kolasch & Birch, LLP

(57) ABSTRACT

Provided is a curable composition which can form, when cured, a cured product having high surface hardness and offering excellent flexibility and workability. The curable composition according to the present invention contains a cationically curable silicone resin, an epoxy compound other than the cationically curable silicone resin, and a leveling agent. The cationically curable silicone resin includes silsesquioxane units. The cationically curable silicone resin includes epoxy-containing constitutional units in a proportion of 50 mole percent or more of the totality of constitutional units in the cationically curable silicone resin. The cationically curable silicone resin has a number-average molecular weight of 1000 to 3000.

11 Claims, No Drawings

(56) References Cited

OTHER PUBLICATIONS

International Search Report issued in PCT/JP2016/066255 (PCT/ISA/210), dated Aug. 16, 2016.
Written Opinion of the International Searching Authority issued in PCT/JP2016/066255 (PCT/ISA/237), dated Aug. 16, 2016.
Chinese Office Action and Search Report, dated Aug. 2, 2019, for Chinese Application No. 201680035125.5, with an English translation.
Zhao, "Synthesis and Esterification Study of γ-Glycidyl Ether Propoxy POSS", The Department of Graduate Students of Anhui University of Science and Technology, Jun. 7, 2014, 13 pages.
PCI, "BYK®-3550 Awarded the BYK Advance Innovation Prize", URL: https://www.pcimag.com/articles/90539-byk-3550-awarded-the-byk-advance-innovation-Prize, 2010, 2 pages.
U.S. Office Action, dated Jul. 11, 2019, for copending U.S. Appl. No. 15/736,926.
U.S. Office Action, dated May 28, 2019, for copending U.S. Appl. No. 15/736,914.

\* cited by examiner

CURABLE COMPOSITION, AND MOULDED BODY

TECHNICAL FIELD

The present invention relates to a curable composition, and a shaped article having a hardcoat layer made of a cured product of the curable composition. This application claims priority to: Japanese Patent Application No. 2015-122343, Japanese Patent Application No. 2015-122345, and Japanese Patent Application No. 2015-122350, each filed on Jun. 17, 2015 to Japan, the entire contents of each of which applications are incorporated herein by reference.

BACKGROUND ART

There have been circulated hardcoat films each including a substrate (base) and, on one or both sides of the substrate, a hardcoat layer having a surface pencil hardness of about 3H. The hardcoat layers of the hardcoat films are made mainly from UV-curable acrylic monomers (see, for example, Patent Literature (PTL) 1). For higher surface pencil hardness of hardcoat layers, some hardcoat layers further contain nanoparticles.

In contrast, glass is known as a material having extremely high surface hardness. Among such glass, there is known glass that has been subjected to an alkali ion exchange treatment and has a higher surface pencil hardness of up to 9H. Such glass, however, has poor flexibility and workability, is to be produced and processed not through a roll-to-roll process, but by a sheet-to-sheet process. This leads to high production cost.

CITATION LIST

Patent Literature

PTL 1: Japanese Unexamined Patent Application Publication (JP-A) No. 2009-279840

SUMMARY OF INVENTION

Technical Problem

However, the hardcoat films prepared using the UV-curable acrylic monomers are not yet considered to have sufficient surface hardness. In general, exemplary possible solutions to offer higher hardness include the use of multifunctional UV-curable acrylic monomers as the UV-curable acrylic monomers; and the designing of the hardcoat layer to have a larger thickness. Disadvantageously, however, these techniques cause the hardcoat layer to undergo greater cure shrinkage and consequently cause the hardcoat film to suffer from curling and/or cracking. Also disadvantageously, the hardcoat layers further containing nanoparticles may haze (whiten) due to aggregation of the nanoparticles when the nanoparticles have poor compatibility with the UV-curable acrylic monomers.

In contrast, the alkali ion exchange treatment of the glass disadvantageously yields a large amount of alkaline wastewater and puts a heavy load on the environment. Further disadvantageously, such glass is heavy and fragile and costs much. Under these circumstances, demands have been made to provide organic materials that offer flexibility and workability at excellent levels and still have high surface hardness.

Accordingly, the present invention has an object to provide a curable composition which can form, when cured, a cured product having high surface hardness and offering flexibility and workability at excellent levels.

The present invention has another object to provide a shaped article including a hardcoat layer, where the shaped article has flexibility, can be produced and processed through a roll-to-roll process, and still maintains high surface hardness.

In addition, such hardcoat layers of hardcoat films are required to have not only high surface hardness as described above, but also excellent heat resistance, because the hardcoat films have been applied to wider and wider uses in recent years.

Solution to Problem

The inventor of the present invention found that a specific curable composition, when cured, can give a cured product having high surface hardness and offering flexibility and workability at excellent levels. This curable composition includes a polyorganosilsesquioxane, an epoxy compound other than the polyorganosilsesquioxane, and a leveling agent, where the polyorganosilsesquioxane has a silsesquioxane constitutional unit (unit structure), includes an epoxy-containing constitutional unit in a proportion controlled within a specific range, and has a number-average molecular weight controlled within a specific range.

The inventor also found that a specific curable composition, when cured, can give a cured product that retains high flexibility and still has higher surface hardness. This curable composition includes a specific cationically curable silicone resin in combination with a leveling agent and with a (meth)acrylate resin containing a specific functional group.

In addition, the inventor found that a shaped article including a hardcoat layer formed from any of the curable compositions has flexibility, can be produced and processed through a roll-to-roll process, and still maintains high surface hardness. The present invention has been made on the basis of these findings.

Specifically, the present invention provides, in an embodiment, a curable composition containing a cationically curable silicone resin, an epoxy compound other than the cationically curable silicone resin, and a leveling agent. The cationically curable silicone resin is a silicone resin including a silsesquioxane unit. The silicone resin includes an epoxy-containing constitutional unit in a proportion of 50 mole percent or more of the totality of siloxane constitutional units in the cationically curable silicone resin. The silicone resin has a number-average molecular weight of 1000 to 3000.

The epoxy compound in the curable composition may be a cycloaliphatic epoxy compound.

The epoxy compound in the curable composition may be a compound containing a cyclohexane oxide group.

The present invention also provides, in another embodiment, a curable composition including a cationically curable silicone resin, a (meth)acrylate resin, and a leveling agent. The (meth)acrylate resin contains at least one group selected from the class consisting of hydroxy, carboxy, and epoxy. The cationically curable silicone resin includes a silsesquioxane unit as a monomeric constitutional unit. The cationically curable silicone resin includes an epoxy-containing monomeric unit in a proportion of 50 mole percent or more of the totality of all monomeric units. The cationically curable silicone resin has a number-average molecular weight of 1000 to 3000.

In the curable composition, the (meth)acrylate resin may be present in a proportion of 0.1 to 20 parts by weight per 100 parts by weight of the cationically curable silicone resin.

In the curable composition, the cationically curable silicone resin may include a constitutional unit represented by Formula (I) in a proportion of 50 mole percent or more of the totality of siloxane constitutional units in the cationically curable silicone resin, where Formula (I) is expressed as follows:

[Chem. 1]

$$[R^a SiO_{3/2}] \quad (I)$$

wherein $R^a$ is selected from an epoxy-containing group, a hydrocarbon group, and hydrogen.

In the curable composition, the cationically curable silicone resin may further include a constitutional unit represented by Formula (II):

[Chem. 2]

$$[R^b SiO_{2/2}(OR^c)] \quad (II)$$

wherein $R^b$ is selected from an epoxy-containing group, a hydrocarbon group, and hydrogen; and $R^c$ is selected from hydrogen and $C_1$-$C_4$ alkyl, and the cationically curable silicone resin may have a mole ratio of the constitutional unit represented by Formula (I) to the constitutional unit represented by Formula (II) of 5 or more.

In the curable composition, the silsesquioxane unit includes, in combination, a constitutional unit represented by Formula (1) and a constitutional unit represented by Formula (2). Formulae (1) and (2) are expressed as follows:

[Chem. 3]

$$[R^1 SiO_{3/2}] \quad (1)$$

wherein $R^1$ represents a cycloaliphatic-epoxy-containing group,

[Chem. 4]

$$[R^2 SiO_{3/2}] \quad (2)$$

wherein $R^2$ represents optionally substituted aryl.

In the curable composition, the cationically curable silicone resin may have a molecular-weight dispersity (ratio of weight-average molecular weight to number-average molecular weight) of 1.0 to 3.0.

The leveling agent in the curable composition may be at least one leveling agent selected from the class consisting of silicone leveling agents and fluorine-containing leveling agents, and the leveling agent may contain at least one group selected from the class consisting of epoxy-reactive groups and hydrolytically condensable groups.

In addition and advantageously, the present invention provides a shaped article including a hardcoat layer made of a cured product of the curable composition.

Specifically, the present invention relates to the following:

(1) A curable composition containing a cationically curable silicone resin, an epoxy compound other than the cationically curable silicone resin, and a leveling agent, the cationically curable silicone resin being a silicone resin including a silsesquioxane unit, the silicone resin including an epoxy-containing constitutional unit in a proportion of 50 mole percent or more of the totality of siloxane constitutional units in the cationically curable silicone resin, the silicone resin having a number-average molecular weight of 1000 to 3000.

(2) The curable composition according to (1), wherein the epoxy compound is a cycloaliphatic epoxy compound.

(3) The curable composition according to one of (1) and (2), wherein the epoxy compound is a compound containing a cyclohexane oxide group.

(4) A curable composition including a cationically curable silicone resin, a (meth)acrylate resin containing at least one group selected from the class consisting of hydroxy, carboxy, and epoxy, and a leveling agent, the cationically curable silicone resin including a silsesquioxane unit as a monomeric constitutional unit, the cationically curable silicone resin including an epoxy-containing monomeric unit in a proportion of 50 mole percent or more of the totality of all monomeric units, the cationically curable silicone resin having a number-average molecular weight of 1000 to 3000.

(5) The curable composition according to (4), wherein the (meth)acrylate resin is present in a proportion of 0.1 to 20 parts by weight per 100 parts by weight of the cationically curable silicone resin.

(6) The curable composition according to any one of (1) to (5), wherein the constitutional unit represented by Formula (I) is present in a proportion of 50 mole percent or more of the totality of siloxane constitutional units in the cationically curable silicone resin.

(7) The curable composition according to (6), wherein the cationically curable silicone resin further includes a constitutional unit represented by Formula (II), and wherein the cationically curable silicone resin has a mole ratio of the constitutional unit represented by Formula (I) to the constitutional unit represented by Formula (II) of 5 or more.

(8) The curable composition according to any one of (1) to (7), wherein the cationically curable silicone resin includes, as the silsesquioxane unit, a constitutional unit represented by Formula (1) and a constitutional unit represented by Formula (2) in combination.

(9) The curable composition according to any one of (1) to (8), wherein the cationically curable silicone resin has a molecular-weight dispersity (ratio of weight-average molecular weight to number-average molecular weight) of 1.0 to 3.0.

(10) The curable composition according to any one of (1) to (9), wherein the leveling agent is at least one leveling agent selected from the class consisting of silicone leveling agents and fluorine-containing leveling agents, and wherein the leveling agent contains at least one group selected from the class consisting of epoxy-reactive groups and hydrolytically condensable groups.

(11) The curable composition according to any one of (1) to (10), wherein the leveling agent is present in a content (proportion) of 0.001 to 20 parts by weight per 100 parts by weight of the totality of the cationically curable silicone resin.

(12) The curable composition according to any one of (1) to (11), wherein the leveling agent is a hydroxy-containing silicone leveling agent, and wherein the leveling agent is present in a proportion of 0.01 to 5 parts by weight per 100 parts by weight of the cationically curable silicone resin.

(13) The curable composition according to any one of (8) to (12), wherein $R^1$ in Formula (1) includes at least one of groups represented by after-mentioned Formulae (1a) to (1d).

(14) The curable composition according to any one of (4) to (13), wherein the curable composition includes, as the (meth)acrylate resin, a hydroxy-containing (meth)acrylate resin in a proportion of 0.1 to 20 parts by weight per 100 parts by weight of the cationically curable silicone resin.

(15) The curable composition according to any one of (4) to (13), wherein the curable composition includes, as the (meth)acrylate resin, a carboxy-containing (meth)acrylate resin in a proportion of 0.1 to 20 parts by weight per 100 parts by weight of the cationically curable silicone resin.

(16) The curable composition according to any one of (4) to (13), wherein the curable composition includes, as the (meth)acrylate resin, an epoxy-containing (meth)acrylate resin in a proportion of 0.1 to 20 parts by weight per 100 parts by weight of the cationically curable silicone resin.

(17) The curable composition according to any one of (1) to (16), further including a curing catalyst.

(18) The curable composition according to (17), wherein the curing catalyst is selected from a cationic photoinitiator and a cationic thermal initiator.

(19) The curable composition according to any one of (1) to (18), which is a curable composition for hardcoat layer formation.

(20) A cured product of the curable composition according to any one of (1) to (19).

(21) A shaped article including a hardcoat layer made of a cured product of the curable composition according to any one of (1) to (19).

(22) The shaped article according to (21), wherein the hardcoat layer has a thickness of 0.1 to 200 μm.

(23) The shaped article according to one of (21) and (22), further including a transparent substrate layer disposed on or over at least one side of the hardcoat layer.

(24) The shaped article according to any one of (21) to (23), which is produced through a roll-to-roll process.

Advantageous Effects of Invention

As having the configuration, the curable composition according to the present invention, when cured, can form a cured product that has high surface hardness and offers flexibility and workability at excellent levels. As having the configuration, the shaped article according to the present invention has flexibility, can be produced and processed through a roll-to-roll process, and still maintains high surface hardness. The shaped article according to the present invention therefore has both quality and cost advantages.

DESCRIPTION OF EMBODIMENTS

The curable composition according to an embodiment of the present invention is a curable composition including a cationically curable silicone resin, an epoxy compound other than the cationically curable silicone resin, and a leveling agent. The epoxy compound other than the cationically curable silicone resin is hereinafter also simply referred to as an "epoxy compound". In the present description, this curable composition according to the embodiment of the present invention is also referred to as a "first embodiment of the present invention".

The curable composition according to another embodiment of the present invention is a curable composition including a cationically curable silicone resin, a (meth)acrylate resin, and a leveling agent, where the (meth)acrylate resin contains at least one group selected from the class consisting of hydroxy, carboxy, and epoxy. The (meth)acrylate resin containing at least one group selected from the class consisting of hydroxy, carboxy, and epoxy is hereinafter also simply referred to as a "(meth)acrylate resin". In the present description, this curable composition according to the embodiment of the present invention is also referred to as a "second embodiment of the present invention".

Cationically Curable Silicone Resin

The cationically curable silicone resin contained in the curable composition according to the present invention is a silicone resin as follows. The silicone resin includes a silsesquioxane unit. The silicone resin (cationically curable silicone resin) includes an epoxy-containing constitutional unit in a proportion of 50 mole percent or more of the totality of siloxane constitutional units in the silicone resin. The silicone resin has a number-average molecular weight of 1000 to 3000. In the present description, the cationically curable silicone resin is also referred to as a "cationically curable silicone resin for use in the present invention".

The cationically curable silicone resin for use in the present invention includes a silsesquioxane unit. The silsesquioxane is a constitutional unit generally represented by the formula: [RSiO$_{3/2}$] (a so-called T unit). R in the formula is selected from hydrogen and a monovalent organic group, and hereinafter the same.

The cationically curable silicone resin for use in the present invention preferably includes, as the silsesquioxane unit, a constitutional unit represented by Formula (1):

[Chem. 3]

$$[R^1SiO_{3/2}] \quad (1)$$

The constitutional unit represented by Formula (1) results from hydrolysis and condensation of a corresponding hydrolyzable trifunctional silane compound (a non-limiting example thereof is an after-mentioned compound represented by Formula (a)).

In Formula (1), $R^1$ represents an epoxy-containing group (monovalent group). The epoxy-containing group is exemplified typically by known or common groups containing an oxirane ring, such as groups containing a glycidyl group (glycidyl-containing groups) and groups containing a cycloaliphatic epoxy group (cycloaliphatic-epoxy-containing groups).

The cycloaliphatic epoxy group is an epoxy group which contains an alicycle (aliphatic-ring) structure and an epoxy group (oxiranyl group) in a molecule (per molecule) and includes an oxygen atom bonded in a triangular arrangement to two adjacent carbon atoms constituting the alicycle. Non-limiting examples of the alicycle include $C_5$-$C_{12}$ alicycles such as cyclopentane, cyclohexane, and cyclooctyl rings. A substituent or substituents such as alkyls may be bonded to one or more of carbon atoms constituting the alicycle.

The glycidyl-containing groups and the cycloaliphatic-epoxy-containing groups are not limited, but in particular, preferred are groups represented by Formulae (1a) to (1d), more preferred are the groups represented by Formula (1a) and the groups represented by Formula (1c), and furthermore preferred are the groups represented by Formula (1a). These are preferred from the viewpoints of curability of the curable composition, and surface hardness and heat resistance of the resulting cured product. Formulae (1a) to (1d) are expressed as follows:

[Chem. 5]

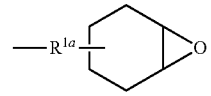

(1a)

[Chem. 6]

-continued

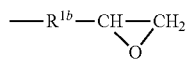

(1b)

[Chem. 7]

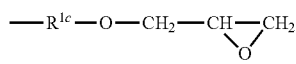

(1c)

[Chem. 8]

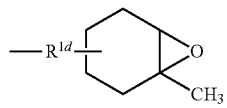

(1d)

In Formula (1a), $R^{1a}$ represents linear or branched alkylene. Non-limiting examples of the linear or branched alkylene include $C_1$-$C_{10}$ linear or branched alkylenes such as methylene, methylmethylene, dimethylmethylene, ethylene, propylene, trimethylene, tetramethylene, pentamethylene, hexamethylene, and decamethylene. In particular, $R^{1a}$ is preferably selected from $C_1$-$C_4$ linear (straight-chain) alkylenes and $C_3$ or $C_4$ branched (branched-chain) alkylenes; more preferably selected from ethylene, trimethylene, and propylene, and furthermore preferably selected from ethylene and trimethylene. These are preferred from the viewpoints of surface hardness and curability of the cured product.

In Formula (1b), $R^{1b}$ represents linear or branched alkylene and is exemplified by groups as with $R^{1a}$. In particular, $R^{1b}$ is preferably selected from $C_1$-$C_4$ linear alkylenes and $C_3$ or $C_4$ branched alkylenes; more preferably selected from ethylene, trimethylene, and propylene; and furthermore preferably selected from ethylene and trimethylene. These are preferred from the viewpoints of surface hardness and curability of the cured product.

In Formula (1c), $R^{1c}$ represents linear or branched alkylene and is exemplified by groups as with $R^{1a}$. In particular, $R^{1c}$ is preferably selected from $C_1$-$C_4$ linear alkylenes and $C_3$ or $C_4$ branched alkylenes; more preferably selected from ethylene, trimethylene, and propylene; and furthermore preferably selected from ethylene and trimethylene. These are preferred from the viewpoints of surface hardness and curability of the cured product.

In Formula (1d), $R^{1d}$ represents linear or branched alkylene and is exemplified by groups as with $R^{1a}$. In particular, $R^{1d}$ is preferably selected from $C_1$-$C_4$ linear alkylenes and $C_3$ or $C_4$ branched alkylenes; more preferably selected from ethylene, trimethylene, and propylene; and furthermore preferably selected from ethylene and trimethylene. These are preferred from the viewpoints of surface hardness and curability of the cured product.

The constitutional unit may include each of different epoxy-containing groups alone or in combination. In particular from the viewpoint of surface hardness of the cured product, the epoxy-containing group is preferably selected from cycloaliphatic-epoxy-containing groups, and particularly preferably selected from groups represented by Formula (1a) in which $R^{1a}$ is ethylene. In particular, the epoxy-containing group is still more preferably a 2-(3,4-epoxycyclohexyl) ethyl group.

The cationically curable silicone resin for use in the present invention may include each of different constitutional units represented by Formula (1) alone or in combination.

The cationically curable silicone resin for use in the present invention may further include a constitutional unit represented by Formula (2) as a silsesquioxane constitutional unit [$RSiO_{3/2}$] other than the constitutional units represented by Formula (1). Formula (2) is expressed as follows:

[Chem. 4]

$$[R^2SiO_{3/2}] \qquad (2)$$

The constitutional unit represented by Formula (2) is a silsesquioxane constitutional unit generally represented by the formula: [$RSiO_{3/2}$] (a T unit). Specifically, the constitutional unit represented by Formula (2) results from hydrolysis and condensation of a corresponding hydrolyzable trifunctional silane compound (a non-limiting example thereof is an after-mentioned compound represented by Formula (b)).

In Formula (2), $R^2$ is selected from a hydrocarbon group and hydrogen. Examples of the hydrocarbon group include, but are not limited to, alkyls, alkenyls, cycloalkyls, cycloalkenyls, aryls, and aralkyls. Non-limiting examples of the alkyls include linear or branched alkyls such as methyl, ethyl, propyl, n-butyl, isopropyl, isobutyl, s-butyl, t-butyl, and isopentyl, of which $C_1$-$C_{10}$ alkyls are typified. Non-limiting examples of the alkenyls include linear or branched alkenyls such as vinyl, allyl, and isopropenyl, of which $C_2$-$C_{10}$ alkenyls are typified. Non-limiting examples of the cycloalkyls include cyclobutyl, cyclopentyl, and cyclohexyl, of which $C_5$-$C_{12}$ cycloalkyls are typified. Non-limiting examples of the cycloalkenyls include cyclopentenyl and cyclohexenyl, of which $C_5$-$C_{12}$ cycloalkenyls are typified. Non-limiting examples of the aryls include phenyl, tolyl, and naphthyl, of which $C_6$-$C_{20}$ aryls are typified. Non-limiting examples of the aralkyls include benzyl and phenethyl, of which $C_6$-$C_{20}$ aryl-$C_1$-$C_4$ alkyls are typified The hydrocarbon group may have one or more substituents. Non-limiting examples of the substituents include ether groups, ester groups, carbonyls, siloxane groups, halogens (such as fluorine), acryls, methacryls, mercaptos, aminos, and hydroxys. Non-limiting examples of the substituents also include the hydrocarbon groups, of which $C_1$-$C_4$ alkyls such as methyl, and $C_6$-$C_{20}$ aryls such as phenyl are generally employed as the substituents.

In particular, $R^2$ is preferably selected from optionally substituted aryls, optionally substituted alkyls, and optionally substituted alkenyls; is more preferably selected from optionally substituted aryls; and is furthermore preferably phenyl.

The proportions of the silsesquioxane constitutional units (the constitutional unit represented by Formula (1) and the constitutional unit represented by Formula (2)) in the cationically curable silicone resin for use in the present invention may be adjusted as appropriate by the formula (proportions) of starting materials (hydrolyzable trifunctional silanes) to form these constitutional units.

In particular in an embodiment, the cationically curable silicone resin for use in the present invention preferably includes the constitutional unit represented by Formula (1) in which $R^1$ is a cycloaliphatic-epoxy-containing group, and the constitutional unit represented by Formula (2) in which $R^2$ is optionally substituted aryl. The cationically curable silicone resin in this embodiment tends to allow the cured product to have surface hardness, flexibility, workability, and flame retardancy at still better levels.

Other than the constitutional unit represented by Formula (1) and the constitutional unit represented by Formula (2), both of which are T units, the cationically curable silicone resin for use in the present invention may further include at least one siloxane constitutional unit selected from the class consisting of constitutional units represented by the formula: [$R_3SiO_{1/2}$] (so-called M units), constitutional units represented by the formula: [$R_2SiO_{2/2}$] (so-called D units), and constitutional units represented by the formula: [$SiO_{4/2}$] (so-called Q units). The group R in the M units and the D units include groups as with $R^1$ in the constitutional unit represented by Formula (1) and $R^2$ in the constitutional unit represented by Formula (2).

The cationically curable silicone resin for use in the present invention is a polyorganosilsesquioxane (silsesquioxane) which includes, as a silsesquioxane unit, a constitutional unit represented by Formula (I). This constitutional unit is also referred to as a "T3 species". Formula (I) is expressed as follows:

[Chem. 1]

[$R^aSiO_{3/2}$]  (I)

When described in more detail, the constitutional unit represented by Formula (I) is represented by Formula (I') below. The three oxygen atoms, which are bonded to the silicon atom specified in the structure represented by Formula (I'), are respectively bonded to other silicon atoms (silicon atoms not shown in Formula (I')). Specifically, the T3 species is a constitutional unit (T unit) resulting from hydrolysis and condensation of a corresponding hydrolyzable trifunctional silane compound. Formula (I') is expressed as follows:

[Chem. 9]

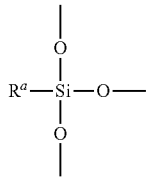

(I')

$R^2$ in Formula (I) (also $R^2$ in Formula (I')) is selected from an epoxy-containing group, a hydrocarbon group, and hydrogen. Non-limiting examples of the epoxy-containing group as $R^2$ are as with $R^2$ in Formula (1). Non-limiting examples of the hydrocarbon group as $R^a$ are as with $R^2$ in Formula (2). $R^a$ in Formula (I) is derived from a group bonded to a silicon atom in the hydrolyzable trifunctional silane compound used as a starting material to form the cationically curable silicone resin for use in the present invention. The group just mentioned above is a group other than alkoxy and halogen and is exemplified typically by, but not limited to, $R^1$ and $R^2$ in after-mentioned Formulae (a) and (b).

In addition to the T3 species, the cationically curable silicone resin for use in the present invention preferably further includes, as the silsesquioxane units, a constitutional unit represented by Formula (II). This constitutional unit is also referred to as a "T2 species". The cationically curable silicone resin for use in the present invention, when further including the T2 species in addition to the T3 species, tends to allow the cured product to have higher surface hardness. This is probably because this cationically curable silicone resin more easily forms a partial cage structure (incompletely condensed cage structure). Formula (II) is expressed as follows:

[Chem. 2]

[$R^bSiO_{2/2}(OR^c)$]  (II)

When described in more detail, the constitutional unit represented by Formula (II) is represented by Formula (II') below. The two oxygen atoms, which are respectively positioned above and below the silicon atom specified in the structure represented by Formula (II'), are bonded respectively to other silicon atoms (silicon atoms not shown in Formula (II')). Specifically, the T2 species is a constitutional unit (T unit) resulting from hydrolysis and condensation of a corresponding hydrolyzable trifunctional silane compound. Formula (II') is expressed as follows:

[Chem. 10]

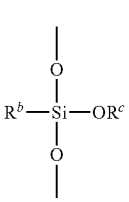

(II')

$R^b$ in Formula (II) (also $R^b$ in Formula (II')) is selected from an epoxy-containing group, a hydrocarbon group, and hydrogen. Examples of the epoxy-containing group as $R^b$ are as with $R^1$ in Formula (1). Examples of the hydrocarbon group as $R^b$ are as with $R^2$ in Formula (2). $R^b$ in Formula (II) is derived from a group bonded to a silicon atom in the hydrolyzable trifunctional silane compound used as the starting material to form the cationically curable silicone resin for use in the present invention. The group just mentioned above is a group other than alkoxy and halogen and is exemplified typically by, but not limited to, $R^1$ and $R^2$ in after-mentioned Formulae (a) and (b).

$R^c$ in Formula (II) (also $R^c$ in Formula (II')) is selected from hydrogen and $C_1$-$C_4$ alkyl. Non-limiting examples of the $C_1$-$C_4$ alkyl include $C_1$-$C_4$ linear or branched alkyls such as methyl, ethyl, propyl, isopropyl, butyl, and isobutyl. In particular, $R^c$ is preferably selected from methyl and ethyl; and is more preferably methyl. The alkyl as $R^c$ in Formula (II) is generally derived from an alkyl moiety constituting an alkoxy group in the hydrolyzable silane compound used as the starting material to form the cationically curable silicone resin for use in the present invention. Non-limiting examples of the alkoxy group include alkoxys exemplified as after-mentioned $X^1$ and $X^2$.

The mole ratio of the constitutional unit represented by Formula (I) (T3 species) to the constitutional unit represented by Formula (II) (T2 species) in the cationically curable silicone resin for use in the present invention is not limited, but is preferably 5 or more, more preferably 5 to 20, furthermore preferably 5 to 18, furthermore preferably 6 to 16, still more preferably 7 to 15, and particularly preferably 8 to 14. The mole ratio of the constitutional unit represented by Formula (I) to the constitutional unit represented by Formula (II) is also referred to as a "T3 to T2 mole ratio". The cationically curable silicone resin, when having a T3 to T2 mole ratio of 5 or more, tends to allow the cured product to have higher surface hardness and better adhesiveness typically with a substrate.

The T3 to T2 mole ratio in the cationically curable silicone resin for use in the present invention may be determined typically by $^{29}$Si-NMR spectrum measurement. In a $^{29}$Si-NMR spectrum, the silicon atom in the constitutional unit represented by Formula (I) (T3 species) and the silicon atom in the constitutional unit represented by Formula (II) (T2 species) give signals (peaks) at different positions due to chemical shift. These peaks are integrated, and the ratio between them is calculated to determine the T3 to T2 mole ratio. Specifically, for example, assume that the cationically curable silicone resin for use in the present invention includes a constitutional unit represented by Formula (1) in which $R^1$ is 2-(3,4-epoxycyclohexyl)ethyl. In this case, the silicon atom in the structure represented by Formula (I) (T3 species) offers a signal appearing at −64 to −70 ppm, whereas the silicon atom in the structure represented by Formula (II) (T2 species) offers a signal appearing at −54 to −60 ppm. On the basis of this, T3 to T2 mole ratio in this case can be determined by calculating the ratio of the integrated signal at −64 to −70 ppm (assigned to the T3 species) to the integrated signal at −54 to −60 ppm (assigned to the T2 species).

The $^{29}$Si-NMR spectrum of the cationically curable silicone resin for use in the present invention may be measured typically with an apparatus under conditions as follows:

Measuring apparatus: JNM-ECA500 NMR (trade name, supplied by JEOL Ltd.)
Solvent: deuterated chloroform
Number of scans: 1800
Measurement temperature: 25° C.

Assume that the cationically curable silicone resin for use in the present invention has a T3 to T2 mole ratio of 5 or more. This means that the T2 species is present in a proportion at a certain level or higher relative to the T3 species, in the cationically curable silicone resin for use in the present invention. Non-limiting examples of the T2 species include constitutional units represented by Formula (3), and constitutional units represented by Formula (4) below. $R^1$ in Formula (3) and $R^2$ in Formula (4) are defined respectively as with $R^1$ in Formula (1) and $R^2$ in Formula (2). $R^c$ in Formulae (3) and (4) is selected from hydrogen and $C_1$-$C_4$ alkyl, as with $R^c$ in Formula (II). Formulae (3) and (4) are expressed as follows:

[Chem. 11]

$$[R^1SiO_{2/2}(OR^c)] \quad (3)$$

[Chem. 12]

$$[R^2SiO_{2/2}(OR^c)] \quad (4)$$

The cationically curable silicone resin for use in the present invention may be a silsesquioxane having a cage structure (in particular, a partial cage structure) (may be a cage silsesquioxane).

In general, a complete-cage (fully condensed cage) silsesquioxane is a polyorganosilsesquioxane that includes the T3 species alone and is devoid of T2 species in a molecule. Specifically, assume that a cationically curable silicone resin has a T3 to T2 mole ratio of 5 or more and gives one intrinsic absorption peak at around 1100 $cm^{-1}$ in an FT-IR spectrum as described below. It is suggested that this cationically curable silicone resin has a partial cage silsesquioxane structure.

Whether a cationically curable silicone resin has a cage (partial cage) silsesquioxane structure may be determined by an FT-IR spectrum (reference: R. H. Raney, M. Itoh, A. Sakakibara, and T. Suzuki, Chem. Rev. 95, 1409 (1995)). Specifically, assume that a cationically curable silicone resin does not give intrinsic absorption peaks individually at around 1050 $cm^{-1}$ and at around 1150 $cm^{-1}$, but gives one intrinsic absorption peak at around 1100 $cm^{-1}$ in the FT-IR spectrum. This cationically curable silicone resin can be identified as having a cage (partial cage) silsesquioxane structure. In contrast, assume that a cationically curable silicone resin gives intrinsic absorption peaks both at around 1050 $cm^{-1}$ and at around 1150 $cm^{-1}$ in the FT-IR spectrum. This cationically curable silicone resin is identified as having a ladder silsesquioxane structure. The FT-IR spectra of the cationically curable silicone resins may be measured typically with an apparatus under conditions as follows:

Measuring apparatus: FT-720 (trade name, supplied by HORIBA, Ltd.)
Measurement method: through transmission
Resolution: 4 $cm^{-1}$
Measurement wavenumber range: 400 to 4000 $cm^{-1}$
Number of scans: 16

The proportion (totality) of the epoxy-containing constitutional unit or units in the cationically curable silicone resin for use in the present invention is 50 mole percent or more, typically 50 to 100 mole percent, preferably 55 to 100 mole percent, more preferably 65 to 99.9 mole percent, furthermore preferably 80 to 99 mole percent, and particularly preferably 90 to 98 mole percent, of the totality (100 mole percent) of siloxane constitutional units (the totality of all siloxane constitutional units: M units, D units, T units, and Q units) in the cationically curable silicone resin. Non-limiting examples of the epoxy-containing constitutional units include the constitutional units represented by Formula (1) and the constitutional units represented by Formula (3). The cationically curable silicone resin, as including the epoxy-containing constitutional unit in a proportion of 50 mole percent or more, allows the curable composition to offer better curability and allows the cured product to have significantly high surface hardness. The proportions of the individual siloxane constitutional units in the cationically curable silicone resin may be calculated on the basis typically of the formula of starting materials and/or via NMR spectrum measurement.

The proportion of the constitutional unit represented by Formula (I) (T3 species) in the cationically curable silicone resin for use in the present invention is not limited, but is preferably 50 mole percent or more (e.g., 50 to 100 mole percent), more preferably 60 to 99 mole percent, furthermore preferably 70 to 98 mole percent, still more preferably 80 to 95 mole percent, and particularly preferably 85 to 92 mole percent, of the totality (100 mole percent) of siloxane constitutional units (the totality of all siloxane constitutional units: M units, D units, T units, and Q units) in the cationically curable silicone resin. The cationically curable silicone resin, when including the T3 species constitutional unit in a proportion of 50 mole percent or more, tends to allow the cured product to have higher surface hardness. This is probably because the resulting curable composition tends to more easily form a partial cage structure having an appropriate molecular weight.

The proportion (totality) of the constitutional unit represented by Formula (2) and the constitutional unit represented by Formula (4) in the cationically curable silicone resin for use in the present invention is not limited, but is preferably 0 to 70 mole percent, more preferably 0 to 60 mole percent, furthermore preferably 0 to 40 mole percent, and particularly preferably 1 to 15 mole percent, of the totality (100 mole percent) of siloxane constitutional units (the totality of all siloxane constitutional units: M units, D units, T units, and Q units) in the cationically curable silicone resin. Control of the proportion to 70 mole percent or less gives a relatively higher proportion of the epoxy-containing constitutional unit, and this tends to allow the curable composition to have better curability and tends to allow the cured product to have higher surface hardness.

The proportion (totality) of the constitutional unit represented by Formula (I) and the constitutional unit represented by Formula (II) (in particular, the total proportion of the T3 species and the T2 species) in the cationically curable silicone resin for use in the present invention is not limited, but is preferably 60 mole percent or more (e.g., 60 to 100 mole percent), more preferably 70 mole percent or more, furthermore preferably 80 mole percent or more, and particularly preferably 90 mole percent or more, of the totality (100 mole percent) of siloxane constitutional units (the totality of all siloxane constitutional units: M units, D units, T units, and Q units) in the cationically curable silicone resin. Control of the proportion to 60 mole percent or more tends to allow the cured product to have higher surface hardness. This is probably because the resulting curable composition tends to easily form a partial cage structure having an appropriate molecular weight. In particular, the proportion (totality) of the constitutional unit represented by Formula (1), the constitutional unit represented by Formula (2), the constitutional unit represented by Formula (3), and the constitutional unit represented by Formula (4) preferably falls within the range.

The cationically curable silicone resin for use in the present invention has a number-average molecular weight (Mn) of 1000 to 3000, preferably 1000 to 2800, more preferably 1100 to 2600, and furthermore preferably 1500 to 2500, as determined by gel permeation chromatography and calibrated with a polystyrene standard. Control of the number-average molecular weight to 1000 or more allows the cured product to have higher surface hardness, and tends to allow the cured product to have heat resistance and scratch resistance at better levels. In contrast, control of the number-average molecular weight to 3000 or less allows the cured product to have flexibility and workability at better levels. The control also tends to allow the cationically curable silicone resin to have better compatibility with other components in the curable composition and to give a cured product having better heat resistance.

The molecular-weight dispersity (Mw/Mn) of the cationically curable silicone resin for use in the present invention is not limited, but is preferably 1.0 to 3.0, more preferably 1.1 to 2.0, furthermore preferably 1.2 to 1.9, still more preferably 1.3 to 1.8, and particularly preferably 1.45 to 1.80, as determined by gel permeation chromatography and calibrated with a polystyrene standard. The cationically curable silicone resin, when having a molecular-weight dispersity of 3.0 or less, tends to allow the cured product to have higher surface hardness and to have better adhesiveness typically with a substrate. In contrast, the cationically curable silicone resin, when having a molecular-weight dispersity of 1.0 or more (in particular, 1.1 or more), tends to easily become liquid and to offer better handleability.

The number-average molecular weight and the molecular-weight dispersity of the cationically curable silicone resin for use in the present invention may be measured with an apparatus under conditions as follows:

Measuring apparatus: LC-20AD (trade name, supplied by Shimadzu Corporation)
Columns: two Shodex KF-801 columns, a KF-802 column, and a KF-803 column (supplied by Showa Denko K.K.)
Measurement temperature: 40° C.
Eluent: THF, in a sample concentration of 0.1 to 0.2 weight percent
Flow rate: 1 mL/min.
Detector: UV-VIS detector SPD-20A (trade name, supplied by Shimadzu Corporation)
Molecular weight: calibrated with a polystyrene standard The 5% weight loss temperature ($T_{d5}$) in an air atmosphere of the cationically curable silicone resin for use in the present invention is not limited, but is preferably 330° C. or higher (e.g., 330° C. to 450° C.), more preferably 340° C. or higher (e.g., 340° C. to 420° C.), and furthermore preferably 350° C. or higher (e.g., 350° C. to 400° C.). The cationically curable silicone resin, when having a 5% weight loss temperature of 330° C. or higher, tends to allow the cured product to have better heat resistance. In particular, the cationically curable silicone resin for use in the present invention is controlled to have a 5% weight loss temperature controlled to 330° C. or higher by controlling the cationically curable silicone resin to have a T3 to T2 mole ratio of 5 or more, a number-average molecular weight of 1000 to 3000, and a molecular-weight dispersity of 1.0 to 3.0, and to give one intrinsic peak at around 1100 cm$^{-1}$ in the FT-IR spectrum. This cationically curable silicone resin is controlled to have. The "5% weight loss temperature" refers to a temperature at the time point when a sample heated at a predetermined rate of temperature rise loses 5% of its initial weight (weight before heating). The 5% weight loss temperature serves as an index for heat resistance. The 5% weight loss temperature may be measured by thermogravimetry (TGA) in an air atmosphere at a rate of temperature rise of 5° C./min.

The cationically curable silicone resin for use in the present invention can be produced by any of known or common methods for producing polysiloxanes without limitation, but may be produced typically by subjecting one or more hydrolyzable silane compounds to hydrolysis and condensation. Non-limiting examples of the hydrolyzable silane compounds usable herein include silane compounds corresponding to constitutional units in the cationically curable silicone resin for use in the present invention. However, part of the hydrolyzable silane compounds contains an epoxy group, and the epoxy-containing hydrolyzable silane compound is used in an amount within such a range that the proportion is 50 mole percent or more of the totality of constitutional units constituting the cationically curable silicone resin for use in the present invention.

More specifically, the cationically curable silicone resin for use in the present invention may be produced typically by subjecting a compound represented by Formula (a), where necessary in combination with a compound represented by Formula (b), to hydrolysis and condensation, where the compound represented by Formula (a) and the compound represented by Formula (b) are hydrolyzable silane compounds to form silsesquioxane constitutional units (T units) in the cationically curable silicone resin for use in the present invention. Formulae (a) and (b) are expressed as follows:

[Chem. 13]

(a)

[Chem. 14]

(b)

The compound represented by Formula (a) is a compound to form the constitutional unit represented by Formula (1) in the cationically curable silicone resin for use in the present invention. $R^1$ in Formula (a) represents an epoxy-containing group, as with $R^1$ in Formula (1). Specifically, $R^1$ in Formula (a) is preferably selected from the groups represented by Formulae (1a) to (1d); more preferably selected from the groups represented by Formula (1a) and the groups represented by Formula (1c); furthermore preferably selected from the groups represented by Formula (1a); and particularly preferably selected from the groups represented by Formula (1a) in which $R^{1a}$ is ethylene. In particular, $R^1$ is still more preferably a 2-(3,4-epoxycyclohexyl)ethyl group.

$X^1$ in Formula (a) is, independently in each occurrence, selected from alkoxy and halogen. Non-limiting examples of the alkoxy as $X^1$ include $C_1$-$C_4$ alkoxys such as methoxy, ethoxy, propoxy, isopropyloxy, butoxy, and isobutyloxy. Non-limiting examples of the halogen as $X^1$ include fluorine, chlorine, bromine, and iodine. Among them, each occurrence of $X^1$ is preferably selected from alkoxys, and more preferably selected from methoxy and ethoxy. The three occurrences of $X^1$ may be identical to or different from one another.

The compound represented by Formula (b) is a compound to form the constitutional unit represented by Formula (2) in the cationically curable silicone resin for use in the present invention. $R^2$ in Formula (b) is selected from a hydrocarbon group and hydrogen, as with $R^2$ in Formula (2). Specifically, $R^2$ in Formula (b) is preferably selected from optionally substituted aryls, optionally substituted alkyls, and optionally substituted alkenyls; more preferably selected from optionally substituted aryls; and is furthermore preferably phenyl.

$X^2$ in Formula (b) is, independently in each occurrence, selected from alkoxy and halogen. Non-limiting examples of $X^2$ are as with $X^1$. In particular, $X^2$ is preferably selected from alkoxys, and more preferably selected from methoxy and ethoxy. The three occurrences of $X^2$ may be identical to or different from one another.

The hydrolyzable silane compounds for use herein may also include one or more hydrolyzable silane compounds other than the compounds represented by Formulae (a) and (b). Examples of such other hydrolyzable silane compounds include, but are not limited to, hydrolyzable trifunctional silane compounds other than the compounds represented by Formulae (a) and (b); hydrolyzable monofunctional silane compounds to form M units; hydrolyzable bifunctional silane compounds to form D units; and hydrolyzable tetrafunctional silane compounds to form Q units.

The amounts and formula (proportions) of the hydrolyzable silane compounds may be adjusted as appropriate according to the desired structure of the cationically curable silicone resin. For example, the amount of the compound represented by Formula (a) is not limited, but is preferably 50 mole percent or more (e.g., 55 to 100 mole percent), more preferably 65 to 99.9 mole percent, furthermore preferably 80 to 99 mole percent, and particularly preferably 90 to 98 mole percent, of the totality (100 mole percent) of hydrolyzable silane compounds to be used.

The amount of the compound represented by Formula (b) is not limited, but is preferably 0 to 70 mole percent, more preferably 0 to 60 mole percent, furthermore preferably 0 to 40 mole percent, and particularly preferably 1 to 15 mole percent, of the totality (100 mole percent) of hydrolyzable silane compounds to be used.

The total proportion (proportion of the totality) of the compound represented by Formula (a) and the compound represented by Formula (b) is not limited, but preferably 60 to 100 mole percent, more preferably 70 to 100 mole percent, and furthermore preferably 80 to 100 mole percent, of the totality (100 mole percent) of hydrolyzable silane compounds to be used.

When two or more different hydrolyzable silane compounds are used in combination, the reactions of hydrolysis and condensation of these hydrolyzable silane compounds may be performed simultaneously or non-simultaneously. The reactions, when performed non-simultaneously, may be performed in any sequence.

The hydrolysis and condensation of the hydrolyzable silane compound may be performed in the presence of, or in the absence of, a solvent. In particular, the reaction(s) is preferably performed in the presence of a solvent. Non-limiting examples of the solvent include aromatic hydrocarbons such as benzene, toluene, xylenes, and ethylbenzene; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile; and alcohols such as methanol, ethanol, isopropyl alcohol, and butanol. In particular, the solvent is preferably selected from ketones and ethers. Each of different solvents may be used alone or in combination.

The amount of the solvent is not limited and may be adjusted as appropriate according typically to the desired reaction time, within the range of 0 to 2000 parts by weight per 100 parts by weight of the totality of the hydrolyzable silane compound.

The hydrolysis and condensation of the hydrolyzable silane compound is preferably performed in the presence of a catalyst and water. The catalyst may be either an acid catalyst or an alkaline catalyst. Non-limiting examples of the acid catalyst include mineral acids such as hydrochloric acid, sulfuric acid, nitric acid, phosphoric acid, and boric acid; phosphoric esters; carboxylic acids such as acetic acid, formic acid, and trifluoroacetic acid; sulfonic acids such as methanesulfonic acid, trifluoromethanesulfonic acid, and p-toluenesulfonic acid; solid acids such as activated clay; and Lewis acids such as iron chloride. Non-limiting examples of the alkaline catalyst include alkali metal hydroxides such as lithium hydroxide, sodium hydroxide, potassium hydroxide, and cesium hydroxide; alkaline earth metal hydroxides such as magnesium hydroxide, calcium hydroxide, and barium hydroxide; alkali metal carbonates such as lithium carbonate, sodium carbonate, potassium carbonate, and cesium carbonate; alkaline earth metal carbonates such as magnesium carbonate; alkali metal hydrogencarbonates such as lithium hydrogencarbonate, sodium hydrogencarbonate, potassium hydrogencarbonate, and cesium hydrogencarbonate; alkali metal organic acid salts such as lithium acetate, sodium acetate, potassium acetate, and cesium acetate, of which acetates are typified; alkaline earth metal organic acid salts such as magnesium acetate, of which acetates are typified; alkali metal alkoxides such as lithium methoxide, sodium methoxide, sodium ethoxide, sodium isopropoxide, potassium ethoxide, and potassium t-butoxide; alkali metal phenoxides such as sodium phenoxide; amines such as triethylamine, N-methylpiperidine, 1,8-diazabicyclo[5.4.0]undec-7-ene, and 1,5-diazabicyclo[4.3.0]non-5-ene, of which tertiary amines are typified; and nitrogen-containing heteroaromatic compounds such as pyridine, 2,2'-bipyridyl, and 1,10-phenanthroline. Each of different catalysts may be used alone or in combination. The catalyst may also be used as a solution or dispersion typically in water and/or a solvent.

The amount of the catalyst is not limited, and may be adjusted as appropriate within the range of 0.002 to 0.200 mole per mole of the totality of the hydrolyzable silane compound.

The amount of water in the hydrolysis and condensation is not limited and may be adjusted as appropriate within the range of 0.5 to 20 moles per mole of the totality of the hydrolyzable silane compound.

The water may be added in any manner not limited, and may be added collectively in the whole quantity (totality to be used), or non-collectively. The water, when added non-collectively, may be added continuously or intermittently.

It is important that the reaction conditions for the hydrolysis and condensation of the hydrolyzable silane compound are selected, in particular, so that the resulting cationically curable silicone resin includes the epoxy-containing constitutional unit in a proportion of 50 mole percent or more of the totality of constitutional units in the cationically curable silicone resin, and has a number-average molecular weight of 1000 to 3000. The reaction temperature of the hydrolysis and condensation is not limited, but is preferably 40° C. to 100° C., and more preferably 45° C. to 80° C. Control of the reaction temperature within the range tends to enable more efficient control of the proportion and the number-average molecular weight of the epoxy-containing constitutional unit within the ranges and tends to efficiently control the T3 to T2 mole ratio to 5 or more. The reaction time of the hydrolysis and condensation is not limited, but is preferably 0.1 to 10 hours, and more preferably 1.5 to 8 hours. The hydrolysis and condensation may be performed at normal atmospheric pressure, under pressure (under a load), or under reduced pressure. The atmosphere in which the hydrolysis and condensation is performed is not limited and may be any atmosphere exemplified typically by inert gas atmospheres such as nitrogen atmosphere and argon atmosphere; and atmospheres in the presence of oxygen, such as air atmosphere. However, the atmosphere is preferably an inert gas atmosphere.

The hydrolysis and condensation of the hydrolyzable silane compound gives the cationically curable silicone resin including polyorganosilsesquioxane units (polyorganosilsesquioxane), for use in the present invention. After the completion of the hydrolysis and condensation, the catalyst is preferably neutralized so as to restrain the ring opening of the epoxy groups. The obtained cationically curable silicone resin may be separated/purified typically by a separation means such as water washing (rinsing), acid washing, alkali washing, filtration, concentration, distillation, extraction, crystallization, recrystallization, or column chromatography, or by a separation means as any combination of them.

Epoxy Compound

The curable composition according to the first embodiment of the present invention includes an epoxy compound other than the cationically curable silicone resin for use in the present invention. The curable composition according to the present invention, when further including the epoxy compound in addition to the cationically curable silicone resin for use in the present invention, can form a cured product that has high surface hardness and offers flexibility and workability at excellent levels.

The epoxy compound for use herein may be selected from known or common compounds containing one or more epoxy groups (oxirane rings) in a molecule, and is not limited. Non-limiting examples of the epoxy compound include cycloaliphatic epoxy compounds (cycloaliphatic epoxy resins), aromatic epoxy compounds (aromatic epoxy resins), and aliphatic epoxy compounds (aliphatic epoxy resins). In particular, the epoxy compound is preferably selected from cycloaliphatic epoxy compounds.

The cycloaliphatic epoxy compounds may be known or common compounds containing one or more alicycles and one or more epoxy groups in a molecule and are not limited. Non-limiting examples of the cycloaliphatic epoxy compounds include (1) compounds containing a cycloaliphatic epoxy group in a molecule, where the "cycloaliphatic epoxy group" refers to an epoxy group containing an alicycle and an oxygen atom bonded in a triangular arrangement to adjacent two carbon atoms constituting the alicycle; (2) compounds containing an alicycle and an epoxy group directly bonded to the alicycle through a single bond; and (3) compounds containing an alicycle and a glycidyl ether group in a molecule (glycidyl ether epoxy compounds).

The compounds (1) containing a cycloaliphatic epoxy group in a molecule for use herein may be arbitrarily selected from known or common ones. In particular, the cycloaliphatic epoxy group is preferably a cyclohexene oxide group. Of the compounds (1), preferred are compounds represented by Formula (i):

[Chem. 15]

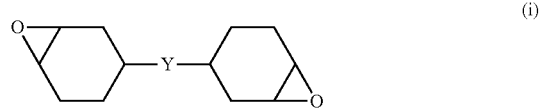

(i)

In Formula (i), Y is selected from a single bond and a linkage group (divalent group containing one or more atoms). Non-limiting examples of the linkage group include divalent hydrocarbon groups; alkenylenes with part or all of carbon-carbon double bond(s) being epoxidized; carbonyl; ether bond; ester bond; carbonate group; amido group; and groups including two or more of them linked to each other.

Examples of the divalent hydrocarbon groups include, but are not limited to, $C_4$-$C_{18}$ linear or branched alkylenes; and divalent alicyclic hydrocarbon groups. Non-limiting examples of the $C_1$-$C_{18}$ linear or branched alkylenes include methylene, methylmethylene, dimethylmethylene, ethylene, propylene, and trimethylene. Non-limiting examples of the divalent alicyclic hydrocarbon groups include divalent cycloalkylenes (including cycloalkylidenes), such as 1,2-cyclopentylene, 1,3-cyclopentylene, cyclopentylidene, 1,2-cyclohexylene, 1,3-cyclohexylene, 1,4-cyclohexylene, and cyclohexylidene.

The alkenylenes with part or all of carbon-carbon double bond(s) being epoxidized are also referred to as "epoxidized alkenylenes". Non-limiting examples of alkenylenes from which the epoxidized alkenylenes are derived include $C_2$-$C_8$ linear or branched alkenylenes such as vinylene, propenylene, 1-butenylene, 2-butenylene, butadienylenes, pentenylenes, hexenylenes, heptenylenes, and octenylenes. In particular, of the epoxidized alkenylenes, preferred are alkenylenes with all of carbon-carbon double bond(s) being epoxidized, and more preferred are $C_2$-$C_4$ alkenylenes with all of carbon-carbon double bond(s) being epoxidized.

Representative, but non-limiting examples of the cycloaliphatic epoxy compounds represented by Formula (i) include 3,4,3',4'-diepoxybicyclohexane; and compounds represented by Formulae (i-1) to (i-10) below. The symbols l and m respectively in Formulae (i-5) and (i-7) each independently represent an integer of 1 to 30. R' in Formula (i-5) represents, independently in each occurrence, $C_1$-$C_8$ alkylene and is, in particular, preferably $C_1$-$C_3$ linear or branched alkylene such as methylene, ethylene, propylene, or isopropylene. The numbers n1 to n6 in Formulae (i-9) and (i-10) each independently represent an integer of 1 to 30. Non-limiting examples of the cycloaliphatic epoxy compounds represented by Formula (i) also include 2,2-bis(3,4-epoxycyclohexyl)propane, 1,2-bis(3,4-epoxycyclohexyl)ethane, 2,3-bis(3,4-epoxycyclohexyl)oxirane, and bis(3,4-epoxycyclohexylmethyl) ether. Formulae (i-1) to (i-10) are expressed as follows:

[Chem. 16]

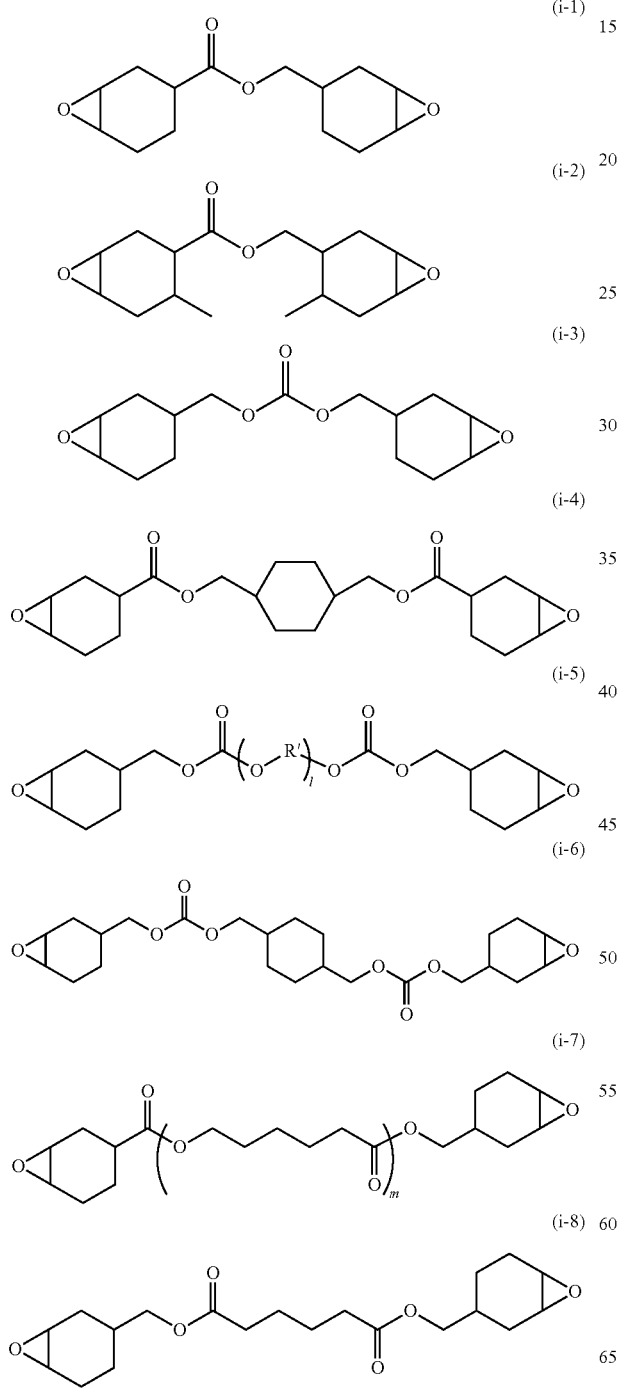

[Chem. 17]

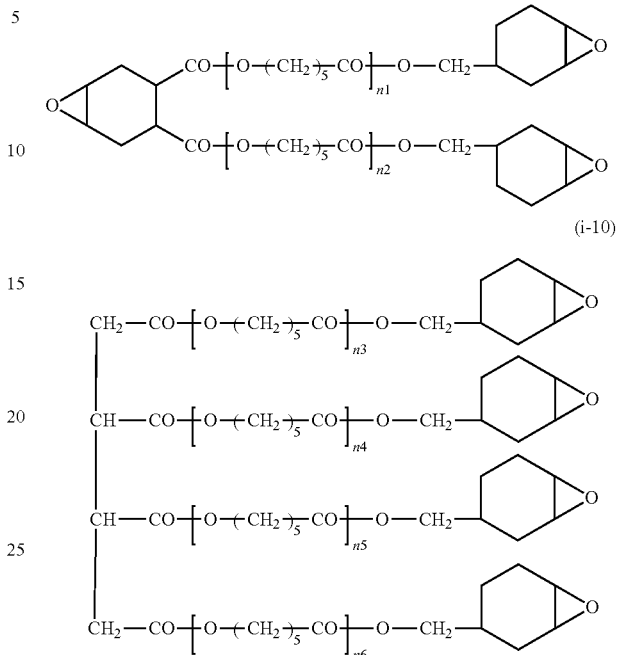

Non-limiting examples of the compounds (2) containing an alicycle and an epoxy group directly bonded to the alicycle through a single bond include compounds represented by Formula (ii):

[Chem. 18]

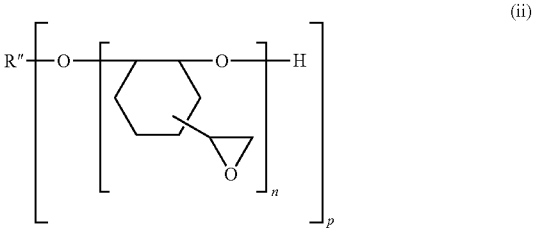

In Formula (ii), R″ is a group (p-valent organic group) resulting from removing "p" hydroxy group(s) (—OH) from the structural formula of a p-hydric alcohol; and p and n each independently represent a natural number. Non-limiting examples of the p-hydric alcohol (R″(OH)$_p$) include polyhydric alcohols such as 2,2-bis(hydroxymethyl)-1-butanol, of which $C_1$-$C_{15}$ alcohols are typified. The number p is preferably 1 to 6, and the number n is preferably 1 to 30. When p is 2 or more, the "p" occurrences of n in the groups in the brackets (outer brackets) may be identical or different. Specifically, a non-limiting example of the compounds represented by Formula (ii) is a 1,2-epoxy-4-(2-oxiranyl)cyclohexane adduct of 2,2-bis(hydroxymethyl)-1-butanol, such as EHPE 3150 (trade name, supplied by Daicel Corporation).

Non-limiting examples of the compounds (3) containing an alicycle and a glycidyl ether group in a molecule include glycidyl ethers of alicyclic alcohols (in particular, alicyclic polyhydric alcohols). More specifically, non-limiting examples of the compounds (3) include 2,2-bis[4-(2,3-epoxypropoxy)cyclohexyl]propane, 2,2-bis[3,5-dimethyl-4-(2,3-epoxypropoxy)cyclohexyl]propane, and other hydrogenated bisphenol-A epoxy compounds, which are compounds resulting from hydrogenating bisphenol-A epoxy compounds; bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, bis[3,5-dimethyl-4-(2,3-epoxypropoxy)cyclohexyl]methane, and other hydrogenated bisphenol-F epoxy compounds, which are compounds resulting from hydrogenating bisphenol-F epoxy compounds; hydrogenated biphenol epoxy compounds; hydrogenated phenol novolac epoxy compounds; hydrogenated cresol novolac epoxy compounds; hydrogenated cresol novolac epoxy compounds derived from bisphenol-A; hydrogenated naphthalene epoxy compounds; hydrogenated epoxy compounds resulting from hydrogenating epoxy compounds derived from trisphenolmethane; and hydrogenated epoxy compounds derived from aromatic epoxy compounds mentioned below.

Non-limiting examples of the aromatic epoxy compounds include epi-bis glycidyl ether epoxy resins resulting from condensing a bisphenol and epihalohydrin with each other, where the bisphenol is exemplified typically by bisphenol-A, bisphenol-F, bisphenol-S, and fluorene-bisphenol; high-molecular-weight epi-bis glycidyl ether epoxy resins resulting from subjecting the epi-bis glycidyl ether epoxy resins further to an addition reaction with the bisphenol; novolac-alkyl glycidyl ether epoxy resins resulting from condensing a phenol and an aldehyde with each other to give a polyhydric alcohol, and further condensing the polyhydric alcohol with an epihalohydrin, where the phenol is exemplified typically by phenol, cresol, xylenols, resorcinol, catechol, bisphenol-A, bisphenol-F, and bisphenol-S, and the aldehyde is exemplified typically by formaldehyde, acetaldehyde, benzaldehyde, hydroxybenzaldehyde, and salicylaldehyde; and epoxy compounds which include a fluorene ring and two phenolic skeletons bonded at the 9-position of the fluorene ring, in which glycidyl groups are bonded directly or through alkyleneoxy to oxygen atoms resulting from removing hydrogen atoms from the hydroxy groups of these phenolic skeletons.

Non-limiting examples of the aliphatic epoxy compounds include glycidyl ethers of q-hydric alcohols devoid of cyclic structures, where q is a natural number; glycidyl esters of monovalent or polyvalent carboxylic acids such as acetic acid, propionic acid, butyric acid, stearic acid, adipic acid, sebacic acid, maleic acid, and itaconic acid; epoxidized derivatives of fats and oils each having a double bond, such as epoxidized linseed oils, epoxidized soybean oils, and epoxidized castor oils; epoxidized derivatives of polyolefins (including polyalkadienes), such as epoxidized polybutadienes. Non-limiting examples of the q-hydric alcohols devoid of cyclic structures include monohydric alcohols such as methanol, ethanol, 1-propyl alcohol, isopropyl alcohol, and 1-butanol; dihydric alcohols such as ethylene glycol, 1,2-propanediol, 1,3-propanediol, 1,4-butanediol, neopentyl glycol, 1,6-hexanediol, diethylene glycol, triethylene glycol, tetraethylene glycol, dipropylene glycol, polyethylene glycols, and polypropylene glycols; and trihydric or higher-hydric alcohols such as glycerol, diglycerol, erythritol, trimethylolethane, trimethylolpropane, pentaerythritol, dipentaerythritol, and sorbitol. The q-hydric alcohols may also be polyether polyols, polyester polyols, polycarbonate polyols, and polyolefin polyols.

The content (proportion) of the epoxy compound is not limited, but is preferably 0.5 to 100 parts by weight, more preferably 1 to 80 parts by weight, and furthermore preferably 5 to 50 parts by weight, per 100 parts by weight of the totality of the cationically curable silicone resin for use in the present invention. The curable composition, when containing the epoxy compound in a proportion of 0.5 part by weight or more, tends to allow the cured product to have higher surface hardness and to offer flexibility and workability at still better levels. In contrast, the curable composition, when containing the epoxy compound in a proportion of 100 parts by weight or less, tends to allow the cured product to have better scratch resistance.

(Meth)Acrylate Resin

The curable composition according to the second embodiment of the present invention includes a (meth)acrylate resin containing at least one group selected from the class consisting of hydroxy, carboxy, and epoxy. The (meth)acrylate resin is a (meth)acrylate resin which contains, in part of its principal chain or side chain, at least one group selected from the class consisting of hydroxy, carboxy, and epoxy.

The (meth)acrylate resin, when containing hydroxy and/or carboxy, allows the curable composition to give a hardcoat layer having, in particular, higher surface hardness through curing. The (meth)acrylate resin, when containing epoxy, allows the curable composition to give a hardcoat layer having, in particular, better flexibility through curing.

Non-limiting examples of a (meth)acrylate (monomer) to constitute the (meth)acrylate resin include (meth)acrylic $C_1$-$C_{20}$ alkyl esters such as methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, octyl (meth)acrylate, 2-ethylhexyl (meth)acrylate, nonyl (meth)acrylate, decyl (meth)acrylate, undecyl (meth)acrylate, tetradecyl (meth)acrylate, and hexadecyl (meth)acrylate. Among them, the (meth)acrylate is preferably selected from (meth)acrylic $C_1$-$C_{12}$ alkyl esters and more preferably selected from (meth)acrylic $C_1$-$C_8$ alkyl esters.

The (meth)acrylate resin may be a polymer derived from the (meth)acrylate or esters alone, or may be a copolymer derived from the (meth)acrylate or esters in combination with another monomer. In particular, the other monomer is preferably selected from nitrogen-containing monomers and is particularly preferably acrylonitrile (AN). The curable composition may include each of different (meth)acrylate resins alone or in combination.

The (meth)acrylate resin may have a weight-average molecular weight (Mw) of typically $10 \times 10^4$ to $20 \times 10^5$, preferably $15 \times 10^4$ to $15 \times 10^5$, more preferably $20 \times 10^4$ to $15 \times 10^5$, and furthermore preferably $30 \times 10^4$ to $10 \times 10^5$, as determined by GPC and calibrated with a polystyrene standard.

When the (meth)acrylate resin is an epoxy-containing (meth)acrylate resin, non-limiting examples of the epoxy group include glycidyl, glycidyl ether groups, oxetanyl, and cycloaliphatic epoxy groups (such as epoxycyclohexyl, epoxycyclopentyl, and 3,4-epoxytricyclo[$5.2.1.0^{2,6}$]decane groups); of which glycidyl and glycidyl ether groups are preferred. Non-limiting examples of monomeric (meth)acrylates containing a glycidyl group include glycidyl (meth)acrylate, glycidylmethyl (meth)acrylate, glycidylethyl (meth)acrylate, and β-methylglycidyl (meth)acrylate. Non-limiting examples of monomeric (meth)acrylates containing a glycidyl ether group include 2-hydroxyethyl acrylate glycidyl ether and 4-hydroxybutyl acrylate glycidyl ether. Non-limiting examples of monomeric (meth)acrylates containing a cycloaliphatic epoxy group include 3,4-epoxycyclohexylmethyl (meth)acrylate, 3,4-epoxycyclohexyl methyl ether (meth)acrylate, 2,3-epoxycyclopentyl methyl ether (meth)acrylate, 3,4-epoxytricyclo[5.2.1.0$^{2,6}$]dec-9-yl (meth)acrylate, and 2-(3,4-epoxytricyclo[5.2.1.0$^{2,6}$]dec-9-yloxy)ethyl (meth)acrylate. The epoxy-containing (meth) acrylate resin for use herein may also be one resulting from subjecting any of these monomers (including the other monomers) to polymerization (copolymerization) by a known or common polymerization method.

The (meth)acrylate resin, when containing hydroxy, may have a hydroxy value of typically 3 to 100 mg KOH/g, preferably 5 to 80 mg KOH/g, and more preferably 10 to 60 mg KOH/g. The (meth)acrylate resin, when containing carboxy, may have an acid value of typically 1 to 60 mg KOH/g, preferably 2 to 50 mg KOH/g, and more preferably 3 to 40 mg KOH/g. The (meth)acrylate resin, when having a hydroxy value and/or an acid value within the range, tends to effectively allow the cured product to have higher surface hardness.

The (meth)acrylate resin, when containing epoxy, may have an epoxy value of typically 0.01 to 1 eq/kg, preferably 0.05 to 0.5 eq/kg, and more preferably 0.1 to 0.3 eq/kg. The (meth)acrylate resin, when having an epoxy value within the range, tends to effectively allow the cured product to have better flexibility.

The hydroxy-containing (meth)acrylate resin, when containing hydroxy, may be available as commercial products typically under the trade names of SG-600 TEA and SG-790 (each from Nagase ChemteX Corporation). The (meth) acrylate resin, when containing carboxy, may be available as commercial products typically under the trade names of SG-280 EK23, SG-70L, SG-708-6, and WS-023 EK30 (each from Nagase ChemteX Corporation). The (meth) acrylate resin, when containing both hydroxy and carboxy, may be available as commercial products typically under the trade names of SG-70L, SG-708-6, and WS-023 EK30 (each from Nagase ChemteX Corporation). The (meth)acrylate resin, when containing epoxy, may be available as commercial products typically under the trade names of SG-P3 and SG-80H (each from Nagase ChemteX Corporation).

The curable composition may contain the (meth)acrylate resin in a content (proportion) of typically 0.1 to 20 parts by weight, preferably 0.2 to 18 parts by weight, more preferably 0.3 to 15 parts by weight, furthermore preferably 0.5 to 12 parts by weight, particularly preferably 1.5 to 8 parts by weight, and most preferably 2 to 6 parts by weight, per 100 parts by weight of the cationically curable silicone resin. The curable composition, when containing the (meth)acrylate resin in a content within the range, allows the cured product to have surface hardness and flexibility at sufficiently high levels.

The hydroxy-containing (meth)acrylate resin may be present in a proportion of typically 0.1 to 20 parts by weight, and preferably 0.5 to 12 parts by weight, per 100 parts by weight of the cationically curable silicone resin. The carboxy-containing (meth)acrylate resin may be present in a proportion of typically 0.1 to 20 parts by weight, and preferably 0.5 to 12 parts by weight, per 100 parts by weight of the cationically curable silicone resin. The epoxy-containing (meth)acrylate resin may be present in a proportion of typically 0.1 to 20 parts by weight, and preferably 0.5 to 12 parts by weight, per 100 parts by weight of the cationically curable silicone resin.

Leveling Agent

The curable compositions according to the present invention include a leveling agent as an essential component. The curable compositions according to the present invention, as including the leveling agent, can have a lower surface tension and allow the cured product to have higher surface hardness. In particular, the curable compositions, as including both the leveling agent and the cationically curable silicone resin for use in the present invention in combination, allow the cured product to have a smoothed surface and to offer better visual properties, such as transparency and gloss, and higher slip. The curable compositions, when employing a specific leveling agent, allow the cured product to have surface hardness and scratch resistance at still better levels, and the curable compositions, when containing such a leveling agent in a controlled proportion (blending ratio), allow the cured product to have these properties at still higher levels.

The leveling agent for use herein may be selected from known or common leveling agents (such as an ethylene oxide adduct of acetylene glycol). In particular, the leveling agent is preferably selected from silicone leveling agents and fluorine-containing leveling agents, from the viewpoint of allowing the curable compositions according to the present invention to have more satisfactorily reduced surface tension.

Examples of the silicone leveling agents include, but are not limited to, leveling agents having a polyorganosiloxane skeleton. Non-limiting examples of the polyorganosiloxane skeleton include polyorganosiloxanes each including one or more of M units, D units, T units, and Q units, as with the cationically curable silicone resin for use in the present invention. In general, polyorganosiloxanes including D units are used. Examples of groups bonded to silicon atoms (silicon atoms constituting siloxane bonds) in the polyorganosiloxane include the hydrocarbon groups exemplified and described as R$^a$ in Formula (I). Among them, the groups are preferably selected from C$_1$-C$_4$ alkyls, and aryls; are more preferably selected from methyl and phenyl; and are furthermore preferably methyl. The groups bonded to the silicon atoms may be identical groups or may be two or more different groups. The repetition number (degree of polymerization) of the siloxane units is not limited, but is preferably 2 to 3000, more preferably 3 to 2000, and furthermore preferably 5 to 1000.

Examples of the fluorine-containing leveling agents include, but are not limited to, leveling agents having an aliphatic fluoro-hydrocarbon skeleton. Examples of the aliphatic fluoro-hydrocarbon skeleton include, but are not limited to, fluoro-C$_1$-C$_{10}$ alkanes such as fluoromethanes, fluoroethanes, fluoropropanes, fluoroisopropanes, fluorobutanes, fluoroisobutanes, fluoro-t-butanes, fluoropentanes, and fluorohexanes.

The aliphatic fluoro-hydrocarbon skeleton is not limited, as long as at least part of hydrogen atoms is replaced with a fluorine atom, but is preferably an aliphatic perfluoro-hydrocarbon skeleton with all hydrogen atoms being replaced with fluorine atoms. This is preferred from the viewpoints of allowing the cured product to have scratch resistance, slip, and anti-fouling properties at better levels.

The aliphatic fluoro-hydrocarbon skeleton may be in the form of a polyfluoroalkylene ether skeleton, which is a constitutional repeating unit through an ether bond. Non-limiting examples of the aliphatic fluoro-hydrocarbon group, which is a constitutional repeating unit, include fluoro-C$_1$-C$_4$ alkylenes such as fluoromethylene, fluoroethylene, fluoropropylene, and fluoroisopropylene groups. The polyfluoroalkylene ether skeleton may include each of different aliphatic fluoro-hydrocarbon groups alone or in combination. The repetition number (degree of polymerization) of the fluoroalkylene ether unit is not limited, but is preferably 10 to 3000, more preferably 30 to 1000, and furthermore preferably 50 to 500.

The leveling agents may each contain one or more functional groups for the impartment of various functionalities. Non-limiting examples of the functional groups include hydrolytically condensable groups, groups that are reactive with epoxy groups (epoxy-reactive groups), radically polymerizable groups, polyether groups, polyester groups, and polyurethane groups. The silicone leveling agents may contain an aliphatic fluoro-hydrocarbon group, whereas the fluorine-containing leveling agents may contain a polyorganosiloxane group.

Non-limiting examples of the hydrolytically condensable groups include hydroxysilyl; trihalosilyls such as trichlorosilyl; dihalo($C_1$-$C_4$ alkyl)silyls such as dichloromethylsilyl; dihalo(aryl)silyls such as dichlorophenylsilyl; halodi($C_1$-$C_4$ alkyl)silyls such as chlorodimethylsilyl; tri($C_1$-$C_4$ alkoxy)silyls such as trimethoxysilyl and triethoxysilyl; di($C_1$-$C_4$ alkoxy) ($C_1$-$C_4$ alkyl)silyls such as dimethoxymethylsilyl and diethoxymethylsilyl; di($C_1$-$C_4$ alkoxy)arylsilyls such as dimethoxyphenyl and diethoxyphenylsilyl; $C_1$-$C_4$ alkoxy-di($C_1$-$C_4$ alkyl)silyls such as methoxydimethylsilyl and ethoxydimethylsilyl; ($C_1$-$C_4$ alkoxy)diarylsilyls such as methoxydiphenylsilyl and ethoxydiphenylsilyl; and $C_1$-$C_4$ alkoxy($C_1$-$C_4$ alkyl)arylsilyls such as methoxymethylphenylsilyl and ethoxymethylphenylsilyl. Among them, tri-($C_1$-$C_4$ alkoxy)silyls are preferred from the viewpoint of reactivity with the cationically curable silicone resin for use in the present invention.

Non-limiting examples of the epoxy-reactive groups include hydroxys, aminos, carboxys, acid anhydride groups (such as maleic anhydride group), and isocyanate groups. Among them, preferred are hydroxys, aminos, acid anhydride groups, and isocyanate groups from the viewpoint of reactivity with the cationically curable silicone resin for use in the present invention and with the epoxy compound; and more preferred is hydroxy from the viewpoints of handleability and availability.

Non-limiting examples of the radically polymerizable groups include (meth)acryloyloxy and vinyl; of which (meth)acryloyloxy is preferred.

Non-limiting examples of the polyether groups include polyoxy-$C_2$-$C_4$ alkylenes such as polyoxyethylenes, polyoxypropylenes, polyoxybutylenes, and polyoxyethylene-polyoxypropylenes. Among them, polyoxy-$C_2$ or $C_3$ alkylenes are more preferred, and polyoxyethylenes are more preferred. In the polyether groups, the repetition number (number of moles added) of oxyalkylene moieties is not limited, but is preferably 2 to 1000, more preferably 3 to 100, and furthermore preferably 5 to 50.

Non-limiting examples of the polyester groups include polyester groups each resulting from a reaction between a dicarboxylic acid and a diol, where the dicarboxylic acid is exemplified typically by aromatic dicarboxylic acids such as terephthalic acid, and aliphatic dicarboxylic acids such as adipic acid, and the diol is exemplified typically by aliphatic diols such as ethylene glycol; and polyester groups each resulting from ring-opening polymerization of a cyclic polyester, where the cyclic polyester is exemplified typically by lactones such as caprolactone.

Non-limiting examples of the polyurethane groups include known or common polyester polyurethane groups and polyether polyurethane groups.

The functional group or groups may be bonded to (introduced into) the polyorganosiloxane skeleton or to the aliphatic fluoro-hydrocarbon skeleton directly, or through a linkage group. Non-limiting examples of the linkage group include alkylenes, cycloalkylenes, ether groups, ester groups, amido, urethane groups, and groups each including two or more of them in combination.

The functional group herein is preferably selected from hydrolytically condensable groups and epoxy-reactive groups; is more preferably selected from epoxy-reactive groups; and is furthermore preferably hydroxy. These are preferred from the viewpoint of being reactive with the cationically curable silicone resin for use in the present invention and allowing the cured product to have still higher surface hardness.

The hydroxy may be a terminal hydroxy of a (poly) oxyalkylene. Non-limiting examples of such hydroxy-containing leveling agents include silicone leveling agents each resulting from introducing a (poly)oxy-$C_2$ or $C_3$ alkylene into the side chain of a polyorganosiloxane skeleton; and fluorine-containing leveling agents each resulting from introducing an aliphatic fluoro-hydrocarbon group into the side chain of a (poly)oxy-$C_2$ or $C_3$ alkylene skeleton.

Non-limiting examples of the hydroxy-containing silicone leveling agents include polyether-modified polyorganosiloxanes each resulting from introducing a polyether group into the principal chain or side chain of a polyorganosiloxane skeleton; polyester-modified polyorganosiloxanes each resulting from introducing a polyester group into the principal chain or side chain of a polyorganosiloxane skeleton; and silicone-modified (meth)acrylic resins each resulting from introducing a polyorganosiloxane into a (meth)acrylic resin. The hydroxy in each of these silicone leveling agents may have a polyorganosiloxane skeleton and/or may have a polyether group, a polyester group, or a (meth)acryloyloxy group. Leveling agents of this type may be available as commercial products such as BYK-370, BYK-SILCLEAN 3700, and BYK-SILCLEAN 3720 (each from BYK Japan KK).

The silicone leveling agents usable herein may be selected from commercially available silicone leveling agents. Non-limiting examples of the commercially available silicone leveling agents include products typically under the trade names of BYK-300, BYK-301/302, BYK-306, BYK-307, BYK-310, BYK-315, BYK-313, BYK-320, BYK-322, BYK-323, BYK-325, BYK-330, BYK-331, BYK-333, BYK-337, BYK-341, BYK-344, BYK-345/346, BYK-347, BYK-348, BYK-349, BYK-370, BYK-375, BYK-377, BYK-378, BYK-UV3500, BYK-UV3510, BYK-UV3570, BYK-3550, BYK-SILCLEAN 3700, and BYK-SILCLEAN 3720 (each from BYK Japan KK); the trade names of AC FS 180, AC FS 360, and AC S 20 (each from Algin Chemie); the trade names of POLYFLOW KL-400X, POLYFLOW KL-400HF, POLYFLOW KL-401, POLYFLOW KL-402, POLYFLOW KL-403, and POLYFLOW KL-404 (each from Kyoeisha Chemical Co., Ltd.); the trade names of KP-323, KP-326, KP-341, KP-104, KP-110, and KP-112 (each from Shin-Etsu Chemical Co., Ltd.); and the trade names of LP-7001, LP-7002, 8032 ADDITIVE, 57 ADDITIVE, L-7604, FZ-2110, FZ-2105, 67 ADDITIVE, 8618 ADDITIVE, 3 ADDITIVE, and 56 ADDITIVE (each from Dow Corning Toray Co., Ltd.).

The fluorine-containing leveling agents usable herein may be selected from commercially available fluorine-containing leveling agents. Non-limiting examples of the commercially available fluorine-containing leveling agents include products under the trade names of Optool DSX and Optool DAC-HP (from Daikin Industries Ltd.); the trade names of Surflon S-242, Surflon S-243, Surflon S-420, Surflon S-611, Surflon S-651, and Surflon S-386 (from AGC Seimi Chemical Co., Ltd.); the trade name of BYK-340 (from BYK Japan KK); the trade names of AC 110a and AC 100a (each from Algin Chemie); the trade names of Megafac F-114, Megafac F-410, Megafac F-444, Megafac EXP TP-2066, Megafac F-430, Megafac F-472SF, Megafac F-477, Megafac F-552, Megafac F-553, Megafac F-554, Megafac F-555, Megafac R-94, Megafac RS-72-K, Megafac RS-75, Megafac F-556, Megafac EXP TF-1367, Megafac EXP TF-1437, Megafac F-558, and Megafac EXP TF-1537 (each from DIC Corporation); the trade names of FC-4430 and FC-4432 (each from Sumitomo 3M Limited); the trade names of FTERGENT 100, FTERGENT 100C, FTERGENT 110, FTERGENT 150, FTERGENT 150CH, FTERGENT A-K, FTERGENT 501, FTERGENT 250, FTERGENT 251, FTERGENT 222F, FTERGENT 208G, FTERGENT 300, FTERGENT 310, and FTERGENT 400SW (each from NEOS Co., Ltd.); and the trade names of PF-136A, PF-156A, PF-151N, PF-636, PF-6320, PF-656, PF-6520, PF-651, PF-652, and PF-3320 (each from Kitamura Chemicals, Co., Ltd.).

The curable compositions may include each of different leveling agents alone or in combination. When the curable compositions include two or more different leveling agents in combination, examples of the combination include the combination of two or more different silicone leveling agents; the combination of two or more different fluorine-containing leveling agents; and the combination of a silicone leveling agent or agents with a fluorine-containing leveling agent or agents.

The leveling agent for use herein is preferably selected from fluorine-containing leveling agents, and more preferably selected from fluorine-containing leveling agents containing a polyether group (in particular, a polyoxyethylene group). These are preferred, in particular, from the viewpoints of allowing the cured product to have lower surface free energy and to have better surface smoothness.

The curable compositions may contain the leveling agent in a content (proportion) not limited, but preferably 0.001 to 20 parts by weight (e.g., 0.01 to 20 parts by weight), more preferably 0.005 to 10 parts by weight, furthermore preferably 0.01 to 5 parts by weight, and particularly preferably 0.025 to 2 parts by weight, per 100 parts by weight of the totality of the cationically curable silicone resin in the present invention. The curable composition, when containing the leveling agent in a content of 0.001 part by weight or more, tends to allow the cured product to have still better surface smoothness. In contrast, the curable composition, when containing the leveling agent in a content of 20 parts by weight or less, tends to allow the cured product to have still higher surface hardness. The curable composition, when containing the leveling agent in a content within the range, tends to allow the cured product to have higher surface hardness. This function has been beyond expectations as a function of leveling agents.

In particular, the silicone leveling agent may be present in a proportion of typically 0.01 to 10 parts by weight, preferably 0.05 to 5 parts by weight, more preferably 0.1 to 3 parts by weight, furthermore preferably 0.2 to 2 parts by weight, and particularly preferably 0.3 to 1.5 parts by weight, per 100 parts by weight of the cationically curable silicone resin. The hydroxy-containing silicone leveling agent may be present in a proportion of typically 0.01 to 5 parts by weight, preferably 0.05 to 4 parts by weight, more preferably 0.1 to 3 parts by weight, furthermore preferably 0.2 to 2 parts by weight, and particularly preferably 0.3 to 1.5 parts by weight, per 100 parts by weight of the cationically curable silicone resin.

The leveling agent, when being a hydroxy-containing silicone leveling agent, may be present in a proportion of typically 0.01 to 5 parts by weight, and preferably 0.1 to 3 parts by weight, per 100 parts by weight of the cationically curable silicone resin.

In particular, the fluorine-containing leveling agent may be present in a proportion of typically 0.05 to 5 parts by weight, preferably 0.1 to 3 parts by weight, more preferably 0.15 to 2 parts by weight, furthermore preferably 0.2 to 1 part by weight, and particularly preferably 0.3 to 0.8 part by weight, per 100 parts by weight of the cationically curable silicone resin. The leveling agent, when controlled to be present in a proportion within these ranges, allows the cured product not only to have better surface smoothness, but also to have higher surface hardness, where this function has been beyond expectations as a function of leveling agents.

Curable Composition

The curable compositions according to the embodiments of the present invention are each a curable composition (curable resin composition) including, as essential components, the cationically curable silicone resin for use in the present invention, and the leveling agent. As described below, the curable compositions according to the present invention may further include one or more other components. Non-limiting examples of the other components include curing catalysts (in particular, cationic photoinitiators); and surface conditioners or surface modifiers.

The curable compositions according to the present invention may include each of different cationically curable silicone resins for use in the present invention alone or in combination.

The curable compositions according to the present invention may contain the cationically curable silicone resins for use in the present invention in a content (proportion) not limited, but preferably from 50 weight percent to less than 100 weight percent, more preferably 60 to 99 weight percent, furthermore preferably 65 to 95 weight percent, particularly preferably 70 to 95 weight percent, and most preferably 80 to 95 weight percent, of the totality (100 weight percent) of the curable composition excluding solvents. The curable compositions, when containing the cationically curable silicone resin for use in the present invention in a content of 50 weight percent or more, tend to allow the cured product to have still higher surface hardness and to offer still better adhesion typically to a substrate. In contrast, the curable compositions, when containing the cationically curable silicone resin for use in the present invention in a content of less than 100 weight percent, are allowed to contain the epoxy compound and the leveling agent and tends to allow the cured product to have surface hardness, flexibility, and workability at still better levels. In addition, these curable compositions are allowed to contain the curing catalyst, and this tends to allow the curing of the curable composition to proceed more efficiently.

The proportion of the cationically curable silicone resin for use in the present invention in the curable compositions is not limited, but preferably 50 to 99 weight percent, more preferably 60 to 98 weight percent, furthermore preferably 65 to 95 weight percent, particularly preferably 70 to 95 weight percent, and most preferably 80 to 95 weight percent, of the totality (100 weight percent) of cationically curable compounds contained in the curable compositions according to the present invention. The curable compositions, when containing the cationically curable silicone resin for use in the present invention in a content of 50 weight percent or more, tend to allow the cured product to have still better surface hardness and adhesion typically to a substrate.

When the curable composition according to the present invention contains the epoxy compound, the total content (total proportion) of the cationically curable silicone resin for use in the present invention and the epoxy compound is not limited, but preferably from 70 weight percent to less than 100 weight percent, more preferably 80 to 99.9 weight percent, and furthermore preferably 90 to 99 weight percent, of the totality (100 weight percent) of the curable composition excluding solvents. The curable composition, when having a total content of the two components of 70 weight percent or more, tends to allow the cured product to have still higher surface hardness and to offer flexibility and workability at still better levels. In contrast, the curable composition, when having a total content of the two components of less than 100 weight percent, is allowed to contain a curing catalyst, and this tends to allow the curing of the curable composition to proceed more efficiently.

The curable compositions according to the present invention preferably further include a curing catalyst. In particular, the curable compositions particularly preferably include a cationic photoinitiator (photocationic polymerization initiator) as the curing catalyst. This is preferred for a shorter curing time required for the resulting cured product to become tack-free.

The curing catalyst is a compound that can initiate or promote cationic polymerization reactions of cationically curable compounds such as the cationically curable silicone resin for use in the present invention and the epoxy compound. Examples of the curing catalyst include, but are not limited to, polymerization initiators such as cationic photoinitiators (photoacid generators) and cationic thermal initiators (thermal acid generators).

The cationic photoinitiators may be selected from known or common cationic photoinitiators and are exemplified by, but are not limited to, sulfonium salts (salts between a sulfonium ion and an anion), iodonium salts (salts between an iodonium ion and an anion), selenium salts (salts between a selenium ion and an anion), ammonium salts (salts between an ammonium ion and an anion), phosphonium salts (salts between a phosphonium ion and an anion), and salts between a transition metal complex ion and an anion. The curable compositions may include each of them alone or in combination. Among them, preferred are highly acidic cationic photoinitiators such as sulfonium salts. These are preferred from the viewpoints of giving better reactivity between the cationically curable silicone resin for use in the present invention and the epoxy compound and allowing the cured product to have still higher surface hardness.

Non-limiting examples of the sulfonium salts include triarylsulfonium salts such as triphenylsulfonium salts, tri-p-tolylsulfonium salts, tri-o-tolylsulfonium salts, tris(4-methoxyphenyl)sulfonium salts, 1-naphthyldiphenylsulfonium salts, 2-naphthyldiphenylsulfonium salts, tris(4-fluorophenyl)sulfonium salts, tri-1-naphthylsulfonium salts, tri-2-naphthylsulfonium salts, tris(4-hydroxyphenyl)sulfonium salts, diphenyl[4-(phenylthio)phenyl]sulfonium salts, and 4-(p-tolylthio)phenyl-di-(p-phenyl)sulfonium salts; diarylsulfonium salts such as diphenylphenacylsulfonium salts, diphenyl(4-nitrophenacyl)sulfonium salts, diphenylbenzylsulfonium salts, and diphenylmethylsulfonium salts; monoarylsulfonium salts such as phenylmethylbenzylsulfonium salts, 4-hydroxyphenylmethylbenzylsulfonium salts, and 4-methoxyphenylmethylbenzylsulfonium salts; and trialkylsulfonium salts such as dimethylphenacylsulfonium salts, phenacyltetrahydrothiophenium salts, and dimethylbenzylsulfonium salts. Among them, triarylsulfonium salts are preferred.

The diphenyl[4-(phenylthio)phenyl]sulfonium salts may be available as commercial products typically under the trade name of CPI-101A (from San-Apro Ltd., a 50% solution of diphenyl[4-(phenylthio)phenyl]sulfonium hexafluoroantimonate in propylene carbonate), and the trade name of CPI-100P (from San-Apro Ltd., a 50% solution of diphenyl[4-(phenylthio)phenyl]sulfonium hexafluorophosphate in propylene carbonate).

Non-limiting examples of the iodonium salts include UV 9380C (trade name, supplied by Momentive Performance Materials Japan LLC, a 45% solution of bis(4-dodecylphenyl)iodonium hexafluoroantimonate in an alkyl glycidyl ether), RHODORSIL PHOTOINITIATOR 2074 (trade name, supplied by Rhodia Japan, Ltd., [(1-methylethyl)phenyl](methylphenyl)iodonium tetrakis(pentafluorophenyl)borate), WPI-124 (trade name, supplied by Wako Pure Chemical Industries, Ltd.), diphenyliodonium salts, di-p-tolyliodonium salts, bis(4-dodecylphenyl)iodonium salts, and bis(4-methoxyphenyl)iodonium salts.

Non-limiting examples of the selenium salts include triarylselenium salts such as triphenylselenium salts, tri-p-tolylselenium salts, tri-o-tolylselenium salts, tris(4-methoxyphenyl) selenium salts, and 1-naphthyldiphenylselenium salts; diarylselenium salts such as diphenylphenacylselenium salts, diphenylbenzylselenium salts, and diphenylmethylselenium salts; monoarylselenium salts such as phenylmethylbenzylselenium salts; and trialkylselenium salts such as dimethylphenacylselenium salts.

Non-limiting examples of the ammonium salts include tetraalkylammonium salts such as tetramethylammonium salts, ethyltrimethylammonium salts, diethyldimethylammonium salts, triethylmethylammonium salts, tetraethylammonium salts, trimethyl-n-propylammonium salts, and trimethyl-n-butylammonium salts; pyrrolidinium salts such as N,N-dimethylpyrrolidinium salts and N-ethyl-N-methylpyrrolidinium salts; imidazolinium salts such as N,N'-dimethylimidazolinium salts and N,N'-diethylimidazolinium salts; tetrahydropyrimidinium salts such as N,N'-dimethyltetrahydropyrimidinium salts and N,N'-diethyltetrahydropyrimidinium salts; morpholinium salts such as N,N-dimethylmorpholinium salts and N,N-diethylmorpholinium salts; piperidinium salts such as N,N-dimethylpiperidinium salts and N,N-diethylpiperidinium salts; pyridinium salts such as N-methylpyridinium salts and N-ethylpyridinium salts; imidazolium salts such as N,N'-dimethylimidazolium salts; quinolinium salts such as N-methylquinolinium salts; isoquinolinium salts such as N-methylisoquinolinium salts; thiazolium salts such as benzylbenzothiazolium salts; and acridinium salts such as benzylacridinium salts.

Non-limiting examples of the phosphonium salts include tetraarylphosphonium salts such as tetraphenylphosphonium salts, tetra-p-tolylphosphonium salts, and tetrakis(2-methoxyphenyl)phosphonium salts; triarylphosphonium salts such as triphenylbenzylphosphonium salts; and tetraalkylphosphonium salts such as triethylbenzylphosphonium salts, tributylbenzylphosphonium salts, tetraethylphosphonium salts, tetrabutylphosphonium salts, and triethylphenacylphosphonium salts.

Non-limiting examples of the salts of a transition metal complex ion include salts of chromium complex cations such as ($\eta^5$-cyclopentadienyl) ($\eta^6$-toluene)$Cr^-$ and ($\eta^5$-cyclopentadienyl) ($\eta^6$-xylene)$Cr^+$; and salts of iron complex cations such as ($\eta^5$-cyclopentadienyl) ($\eta^6$-toluene) $Fe^+$ and ($\eta^5$-cyclopentadienyl) ($\eta^6$-xylene) $Fe^+$.

Non-limiting examples of the anions constituting the salts include $SbF_6^-$, $PF_6^-$, $BF_4^-$, $(CF_3CF_2)_3PF_3^-$, $(CF_3CF_2CF_2)_3PF_3^-$, $(C_6F_5)_4B^-$, $(C_6F_5)_4Ga^-$, sulfonate anions (such as trifluoromethanesulfonate anion, pentafluoroethanesulfonate anion, nonafluorobutanesulfonate anion, methanesulfonate anion, benzenesulfonate anion, and p-toluenesulfonate anion), $(CF_3SO_2)_3C^-$, $(CF_3SO_2)_2N^-$, perhalogen acid ions, halogenated sulfonate ions, sulfate ions, carbonate ions, aluminate ions, hexafluorobismuthate ion, carboxylate ions, arylborate ions, thiocyanate ions, and nitrate ions. Among them, fluorinated alkyl-fluorophosphate ions such as $(CF_3CF_2)_3PF_3^-$ and $(CF_3CF_2CF_2)_3PF_3^-$ are preferred from the viewpoint of solubility.

Non-limiting examples of the cationic thermal initiators include arylsulfonium salts, aryliodonium salts, arene ion complexes, quaternary ammonium salts, aluminum chelates, and boron trifluoride-amine complexes. The curable composition may include each of them alone or in combination. In particular, highly acidic cationic thermal initiators such as arylsulfonium salts are preferred. These are preferred from the viewpoints of giving better reactivity between the cationically curable silicone resin for use in the present invention and the epoxy compound, and allowing the cured product to have still higher surface hardness. Non-limiting examples of anions constituting the salts are as with the anions in the cationic photoinitiators.

Non-limiting examples of the arylsulfonium salts include arylsulfonium hexafluoroantimonates. Such arylsulfonium hexafluoroantimonates for use in the curable composition may be available as commercial products typically under the trade names of SP-66 and SP-77 (each from ADEKA CORPORATION); and the trade names of San-Aid SI-60L, San-Aid SI-60S, San-Aid SI-80L, San-Aid SI-100L, and San-Aid SI-150L (each from SANSHIN CHEMICAL INDUSTRY CO., LTD.). Non-limiting examples of the aluminum chelates include aluminum ethylacetoacetate diisopropylate and aluminum tris(ethyl acetoacetate). Non-limiting examples of the boron trifluoride amine complexes include boron trifluoride monoethylamine complex, boron trifluoride imidazole complex, and boron trifluoride piperidine complex.

The curable compositions according to the present invention may include each of different curing catalysts alone or in combination.

The content (proportion) of the curing catalyst in the curable compositions according to the present invention is not limited, but is preferably 0.01 to 10 parts by weight, more preferably 0.05 to 5 parts by weight, furthermore preferably 0.1 to 3 parts by weight, still more preferably 0.3 to 2.7 parts by weight, and particularly preferably 0.5 to 2.5 parts by weight, per 100 parts by weight of the cationically curable silicone resin for use in the present invention. The curable compositions, when containing the curing catalyst in a proportion of 0.01 part by weight or more, can undergo a curing reaction proceeding efficiently and sufficiently and tends to allow the cured product to have still higher surface hardness and still better adhesion typically to a substrate. In contrast, the curable compositions, when containing the curing catalyst in a proportion of 10 parts by weight or less, tends to allow the cured product to have flexibility and workability at still better levels, tends to have still better storage stability, and tends to less cause coloring of the cured product.

The curable compositions according to the present invention may further include one or more cationically curable compounds other than the cationically curable silicone resin for use in the present invention, the epoxy compounds, and the (meth)acrylate resins. Such other cationically curable compound(s) is also referred to as "other cationically curable compound(s)". The other cationically curable compounds may be selected from known or common cationically curable compounds, are not limited, but are exemplified typically by oxetane compounds and vinyl ether compounds. The curable compositions according to the present invention may include each of different other cationically curable compounds alone or in combination.

The oxetane compounds may be selected from known or common compounds containing one or more oxetane rings in a molecule, are not limited, but are exemplified typically by 3,3-bis(vinyloxymethyl)oxetane, 3-ethyl-3-(hydroxymethyl)oxetane, 3-ethyl-3-(2-ethylhexyloxymethyl)oxetane, 3-ethyl-3-[(phenoxy)methyl]oxetane, 3-ethyl-3-(hexyloxymethyl)oxetane, 3-ethyl-3-(chloromethyl) oxetane, 3,3-bis(chloromethyl)oxetane, 1,4-bis[(3-ethyl-3-oxetanylmethoxy)methyl]benzene, bis{[1-ethyl(3-oxetanyl)]methyl}ether, 4,4'-bis[(3-ethyl-3-oxetanyl)methoxymethyl]bicyclohexyl, 1,4-bis[(3-ethyl-3-oxetanyl)methoxymethyl]cyclohexane, 1,4-bis{[(3-ethyl-3-oxetanyl)methoxy]methyl}benzene, 3-ethyl-3-{[(3-ethyloxetan-3-yl)methoxy]methyl}}oxetane, xylylene bisoxetanes, 3-ethyl-3-{[3-(triethoxysilyl)propoxy]methyl}oxetane, oxetanylsilsesquioxanes, and phenol novolac oxetanes.

The vinyl ether compounds may be selected from known or common compounds containing one or more vinyl ether groups in a molecule, are not limited, but are exemplified typically by 2-hydroxyethyl vinyl ether (ethylene glycol monovinyl ether), 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,6-hexanediol divinyl ether, 1,8-octanediol divinyl ether, 1,4-cyclohexanedimethanol monovinyl ether, 1,4-cyclohexanedimethanol divinyl ether, 1,3-cyclohexanedimethanol monovinyl ether, 1,3-cyclohexanedimethanol divinyl ether, 1,2-cyclohexanedimethanol monovinyl ether, 1,2-cyclohexanedimethanol divinyl ether, p-xylene glycol monovinyl ether, p-xylene glycol divinyl ether, m-xylene glycol monovinyl ether, m-xylene glycol divinyl ether, o-xylene glycol monovinyl ether, o-xylene glycol divinyl ether, ethylene glycol divinyl ether, diethylene glycol monovinyl ether, diethylene glycol divinyl ether, triethylene glycol monovinyl ether, triethylene glycol divinyl ether, tetraethylene glycol monovinyl ether, tetraethylene glycol divinyl ether, pentaethylene glycol monovinyl ether, pentaethylene glycol divinyl ether, oligoethylene glycol monovinyl ethers, oligoethylene glycol divinyl ethers, polyethylene glycol monovinyl ethers, polyethylene glycol divinyl ethers, dipropylene glycol monovinyl ether, dipropylene glycol divinyl ether, tripropylene glycol monovinyl ether, tripropylene glycol divinyl ether, tetrapropylene glycol monovinyl ether, tetrapropylene glycol divinyl ether, pentapropylene glycol monovinyl ether, pentapropylene glycol divinyl ether, oligopropylene glycol monovinyl ethers, oligopropylene glycol divinyl ethers, polypropylene glycol monovinyl ethers, polypropylene glycol divinyl ethers, isosorbide divinyl ether, oxanorbornene divinyl ether, phenyl vinyl ether, n-butyl vinyl ether, isobutyl vinyl ether, octyl vinyl ether, cyclohexyl vinyl ether, hydroquinone divinyl ether, 1,4-butanediol divinyl ether, cyclohexanedimethanol divinyl ethers, trimethylolpropane divinyl ether, trimethylolpropane trivinyl ether, bisphenol-A divinyl ether, bisphenol-F divinyl ether, hydroxyoxanorbornanemethanol divinyl ethers, 1,4-cyclohexanediol divinyl ether, pentaerythritol trivinyl ether, pentaerythritol tetravinyl ether, dipentaerythritol pentavinyl ether, and dipentaerythritol hexavinyl ether.

The content (proportion) of the other cationically curable compounds in the curable compositions according to the present invention is not limited, but preferably 50 weight percent or less (e.g., 0 to 50 weight percent), more preferably 30 weight percent or less (e.g., 0 to 30 weight percent), and furthermore preferably 10 weight percent or less, of the totality (100 weight percent) of cationically curable compounds. The curable compositions, when having a content of the other cationically curable compounds of 50 weight percent or less (in particular, 10 weight percent or less), tends to allow the cured product to have still better scratch resistance. In contrast, the curable compositions, when having a content of the other cationically curable compounds of 10 weight percent or more, may be able to have desired performance or properties, and may be able to impart the performance or properties to the cured product. For example, this configuration may impart rapid curability and/or a modified (adjusted) viscosity to the curable composition.

The curable compositions according to the present invention may further include one or more common additives as other optional components. Non-limiting examples of the additives include fillers exemplified typically by inorganic fillers such as precipitated silica, hydrous silica (wet silica), fumed silica, pyrogenic silica, titanium oxide, alumina, glass, quartz, aluminosilicate, iron oxide, zinc oxide, calcium carbonate, carbon black, silicon carbide, silicon nitride, and boron nitride, as well as inorganic fillers resulting from treating these fillers with any of organosilicon compounds such as organohalosilanes, organoalkoxysilanes, and organosilazanes; fine powders of organic resins such as silicone resins, epoxy resins, and fluorocarbon resins; and conductive powders of metals such as silver and copper. Non-limiting examples of the additives also include curing agents such as amine curing agents, polyaminoamide curing agents, acid anhydride curing agents, and phenolic curing agents; curing assistants; curing accelerators such as imidazoles, alkoxides of alkali metals or alkaline earth metals, phosphines, amide compounds, Lewis acid complex compounds, sulfur compounds, boron compounds, and condensable organometallic compounds; solvents such as water and organic solvents; stabilizers such as antioxidants, ultraviolet absorbers, photostabilizers, thermal stabilizers, and heavy-metal deactivators; flame retardants such as phosphorus flame retardants, halogen flame retardants, and inorganic flame retardants; flame retardant promoters; reinforcers such as other fillers; nucleating agents; coupling agents such as silane coupling agents; lubricants; waxes; plasticizers; mold release agents; impact modifiers; color modifiers (hue modifiers); clearing agents; rheology adjusters such as flow improvers; workability improvers; colorants such as dyes and pigments; antistatic agents; dispersants; surface conditioners such as anti-popping agents; surface modifiers such as slipping agents; delustering agents; antifoaming agents; foam inhibitors; defoaming agents; antimicrobial agents; antiseptic agents; viscosity modifiers; thickeners; photosensitizers; and blowing agents. The curable compositions may contain each of different additives alone or in combination. The content (proportion) of the additives in the curable compositions is not limited, but is preferably 100 parts by weight or less, more preferably 30 parts by weight or less (e.g., 0.01 to 30 parts by weight), and furthermore preferably 10 parts by weight or less (e.g., 0.1 to 10 parts by weight), per 100 parts by weight of the cationically curable silicone resin for use in the present invention, Non-limiting examples of the organic solvents include ketones such as acetone, methyl ethyl ketone, methyl isobutyl ketone, and cyclohexanone; ethers such as dioxane and tetrahydrofuran; aliphatic hydrocarbons such as hexane; alicyclic hydrocarbons such as cyclohexane; aromatic hydrocarbons such as benzene; halogenated hydrocarbons such as dichloromethane and dichloroethane; esters such as methyl acetate and ethyl acetate; alcohols such as ethanol, isopropyl alcohol, butanol, and cyclohexanol; CELLOSOLVEs such as Methyl CELLOSOLVE and Ethyl CELLOSOLVE; CELLOSOLVE acetates; and amides such as dimethylformamide and dimethylacetamide.

The curable compositions according to the present invention may be prepared preferably, but non-limitingly, by stirring and mixing the components with each other at room temperature, or with heating as needed. The curable compositions according to the present invention are usable as a one-part composition, or a multi-part (such as two-part) composition. The one-part composition contains the components, which have been blended beforehand, and is used as intact. In contrast, in the multi-part composition, two or more parts (portions) of the components are stored separately, and the two or more parts are blended in predetermined proportions before use.

The curable compositions according to the present invention, when containing a solvent, may contain other components than the solvent in a proportion of not limited, but preferably 10 to 95 weight percent, more preferably 30 to 90 weight percent, and furthermore preferably 50 to 80 weight percent.

The curable compositions according to the present invention are preferably, but not limitingly, liquid at room temperature (about 25° C.). More specifically, the curable compositions according to the present invention may have a viscosity of typically 300 to 20000 mPa·s, preferably 500 to 10000 mPa·s, and more preferably 1000 to 8000 mPa·s as determined at 25° C. in terms of a liquid resulting from diluting the curable composition with a solvent so as to have a solvent proportion of 20% (in particular, in terms of a curable composition (solution) resulting from diluting the curable composition with methyl isobutyl ketone so as to have a methyl isobutyl ketone proportion of 20 weight percent). The curable compositions, when having a viscosity of 300 mPa·s or more, tend to allow the cured product to have still better heat resistance. In contrast, the curable compositions, when having a viscosity of 20000 mPa·s or less, tend to be prepared and handled more easily and tend to impede bubbles from remaining in the cured product. The viscosity of the curable compositions according to the present invention is measured using a viscometer MCR 301 (trade name, supplied by Anton Paar GmbH) at an oscillation angle of 5%, a frequency of 0.1 to 100 s$^{-1}$, and a temperature of 25° C.

Cured Product

The curable compositions according to the present invention can each be cured to give a cured product by allowing polymerization reaction of cationically curable compounds (such as the cationically curable silicone resin for use in the present invention and the epoxy compound) in the curable compositions to proceed. The cured product (cured product resulting from curing the curable composition) is also referred to as a "cured product in the present invention". The curing technique may be selected as appropriate from known techniques, is not limited, but is exemplified typically by a technique of applying at least one of actinic radiation and heat. The actinic radiation for use herein may be any radiation such as infrared rays, visible light, ultraviolet rays, X rays, electron beams, alpha rays, beta rays, and gamma rays. Among them, ultraviolet rays are preferred for their excellent handleability.

Assume that the curable compositions according to the present invention are cured by irradiation with actinic radiation. Conditions (such as actinic radiation irradiation conditions) in this case may be adjusted as appropriate according typically to the type and energy of the actinic radiation to be applied, and the shape and size (dimensions) of the cured product, and are not limited. For example, irradiation with an ultraviolet ray may preferably be performed at typically about 1 to about 10000 mJ/cm$^2$, preferably 50 to 10000 mJ/cm$^2$, more preferably 70 to 5000 mJ/cm$^2$, and furthermore preferably 100 to 1000 mJ/cm$^2$. To offer better adhesion to an after-mentioned two-dimensional member or three-dimensional member, the irradiation is performed at preferably 300 to 10000 mJ/cm$^2$, and more preferably 500 to 5000 mJ/cm$^2$. The irradiation with the actinic radiation may be performed typically using any of Deep UV lamps, high-pressure mercury lamps, ultra-high pressure mercury lamps, low-pressure mercury lamps, xenon lamps, carbon arc, metal halide lamps, sunlight, LED lamps, halogen lamps, and laser (such as helium-cadmium laser and excimer laser). After the irradiation with the actinic radiation, a heat treatment (annealing, aging) may be performed to allow the curing reaction to further proceed.

When electron beams are applied to cure the curable composition, the dose is not limited, but is preferably 1 to 200 kGy, more preferably 5 to 150 kGy, furthermore preferably 10 to 100 kGy, and particularly preferably 20 to 80 kGy. The acceleration voltage is also not limited, but is preferably 10 to 1000 kV, more preferably 50 to 500 kV, and furthermore preferably 100 to 300 kV.

In contrast, when heat is applied to cure the curable compositions according to the present invention, the conditions are not limited, but the temperature is typically preferably 30° C. to 200° C., more preferably 50° C. to 190° C., and furthermore preferably 60° C. to 180° C. The curing time may be determined as appropriate.

The curable compositions according to the present invention, by curing as described above, can form cured products having high surface hardness and offering flexibility and workability at excellent levels. The curable compositions according to the present invention are each therefore preferably usable, in particular, as a "curable composition for hardcoat layer formation" to form a hardcoat layer in a hardcoat film. This curable composition is also referred to typically as a "hardcoating composition" or a "hardcoating agent". Assume that the curable compositions according to the present invention are each used as the curable composition for hardcoat layer formation to form a hardcoat layer. In this case, the resulting hardcoat film including the hardcoat layer can have such flexibility as to be producible and processable through a roll-to-roll process, while maintaining high hardness. In the present description, the hardcoat layer formed from the curable compositions according to the present invention is also referred to as a "hardcoat layer in the present invention".

Shaped Article

The hardcoat layer in the present invention is a hardcoat layer including (made of) a cured product of any of the curable compositions according to the present invention. A shaped article including the hardcoat layer is also referred to as a "shaped article according to the present invention". The shaped article according to the present invention may be one including the hardcoat layer in the present invention alone, or may be one including a member, and the hardcoat layer in the present invention disposed on the member.

Assume that the shaped article according to the present invention is a shaped article including a member, and the hardcoat layer in the present invention disposed on the member. In this case, the member may be either a two-dimensional member or a three-dimensional member. Materials to form the two-dimensional member and the three-dimensional member are not limited, but exemplified typically by various known or common organic materials and inorganic materials. Non-limiting examples of the two-dimensional member include film-like or sheet-like substrates. The three-dimensional member is not limited in shape. For example, the three-dimensional member may be one having a complicated shape, because the curable compositions according to the present invention have excellent coatability and can easily form a hardcoat layer having a homogeneous thickness.

Of such shaped articles according to the present invention, a film including the hardcoat layer in the present invention is also referred to as a "hardcoat film according to the present invention". Specifically, the hardcoat film according to the present invention is a film including a hardcoat layer made of a cured product of any of the curable compositions according to the present invention. The hardcoat film according to the present invention may be a film including the hardcoat layer in the present invention alone, or a film including a substrate and the hardcoat layer in the present invention disposed on or over at least one side of the substrate.

The hardcoat film according to the present invention, when including the hardcoat layer in the present invention alone, may be used as an alternative (substitute) for glass. The thickness of the hardcoat film is not limited, but is preferably 10 μm or more (e.g., 10 to 1000 μm), more preferably 100 to 900 μm, furthermore preferably 200 to 800 μm, still more preferably 300 to 700 μm, and particularly preferably 400 to 600 μm.

Assume that the hardcoat film according to the present invention is a film including a substrate, and the hardcoat layer in the present invention disposed on or over at least one side of the substrate. In this case, the hardcoat layer in the present invention may be disposed on one side (one surface) of the substrate, or disposed on both sides (both surfaces) of the substrate. The hardcoat layer in the present invention may be disposed partially or fully on one side of, or independently on both sides of, the substrate.

The term "substrate" refers to a portion which serves as a substrate (base) of the hardcoat film according to the present invention and which constitutes a portion other than the hardcoat layer in the present invention. The substrate for use herein is not limited and may be selected from known or common substrates such as plastic substrates, metal substrates, ceramic substrates, semiconductor substrates, glass substrates, paper substrates, wood substrates (wooden substrates), and surface-coated substrates. Among them, the substrate is preferably selected from plastic substrates, which are substrates made from plastic materials.

Non-limiting examples of the plastic materials constituting the plastic substrates include polyolefins such as polyethylenes and polypropylenes; polyesters such as poly(ethylene terephthalate)s (PETs), poly(butylene terephthalate)s (PBTs), and poly(ethylene naphthalate)s (PENs); polyimides; polycarbonates; polyamides; poly(vinyl alcohol)s; polysulfones; polyacetals; poly(phenylene ether)s; poly(phenylene oxide)s; poly(phenylene sulfide)s; polyethersulfones; poly(ether ether ketone)s; cyclic polyolefins exemplified typically by homopolymers (such as addition polymers and ring-opened polymers) of norbornene monomers, copolymers between norbornene and ethylene, and other copolymers between a norbornene monomer and an olefinic monomer (exemplified typically by cyclic olefin copolymers such as addition polymers and ring-opened polymers), and derivatives of them; vinyl polymers such as poly(methyl methacrylate)s (PMMAs) and other acrylic resins, polystyrenes, poly(vinyl chloride)s, and acrylonitrile-styrene-butadiene resins (ABS resins); vinylidene polymers such as poly(vinylidene chloride)s; cellulosic resins such as triacetyl celluloses (TACs); cellulose ester resins; epoxy resins; phenolic resins; melamine resins; urea resins; maleimide resins; silicones; fluorocarbon resins; and any other plastic materials. Each plastic substrate may be made from each of different plastic materials alone or in combination.

Assume that it is intended to give a hardcoat film according to the present invention having excellent transparency. In particular in this case, the plastic substrate is preferably selected from substrates having excellent transparency (transparent substrates) and more preferably selected from polyester films (in particular, PETs, PBTs, and PENs), cyclic polyolefin films, polycarbonate films (in particular, bisphenol-A polycarbonate films), TAC films, and PMMA films. The hardcoat film preferably includes the hardcoat layer in the present invention, and a transparent substrate layer disposed on at least one side of the hardcoat layer.

The plastic substrate may include one or more other additives as needed. Non-limiting examples of the other additives include antioxidants, ultraviolet absorbers, photostabilizers, thermal stabilizers, crystal nucleators, flame retardants, flame retardant promoters, fillers, plasticizers, impact modifiers, reinforcers, dispersants, antistatic agents, blowing agents, and antimicrobial agents. The plastic substrate may include each of different additives alone or in combination.

The plastic substrate may have a single-layer structure or a multi-layer structure and is not limited in its configuration (structure). For example, the plastic substrate may be a plastic substrate having a multi-layer structure which includes a plastic film, and another layer than the hardcoat layer in the present invention, where the other layer is disposed on at least one side of the plastic film. The other layer than the hardcoat layer in the present invention is also simply referred to as "other layer". Non-limiting examples of the multi-layer structure include a structure including the plastic film and the other layer disposed in the specified sequence, and a structure including the other layer, the plastic film, and the other layer disposed in the specified sequence. Non-limiting examples of the other layer include hardcoat layers other than the hardcoat layers in the present invention; and anchor coat layers made from any of adhesives and pressure-sensitive adhesives. Non-limiting examples of materials to constitute the other layer include the plastic materials.

The surface of the plastic substrate may partially or fully have undergone one or more of known or common surface treatments in order typically to improve adhesiveness to the hardcoat layer. Non-limiting examples of the surface treatments include roughening treatments, adhesion facilitating treatments, antistatic treatments, sand blasting, discharge treatments (such as corona discharge treatment and glow discharge treatment), plasma treatments, chemical etching, water matting, flame treatments, acid treatments, alkaline treatments, oxidation treatments, ultraviolet irradiation treatments, and silane coupling agent treatments. In particular, corona discharge treatments are preferred. The plastic substrate may be either an unoriented film or an oriented film (such as an uniaxially oriented film or a biaxially oriented film).

The plastic substrate may be produced typically by any of known or common methods. Non-limiting examples of the methods include a method of shaping any of the plastic materials into a film which serves as a plastic substrate (plastic film); and a method of further forming an appropriate layer (such as the other layer) on or over the plastic film, and/or subjecting the plastic film to an appropriate surface treatment, as needed. The plastic substrate for use herein may also be available as commercial products.

The thickness of the substrate is not limited, but may be selected as appropriate within the range of typically 0.01 to 100000 µm, preferably 1 µm or more (e.g., 1 to 100000 µm), more preferably 20 to 10000 µm, and furthermore preferably 50 to 1000 µm. When the substrate is a transparent substrate, the thickness is not limited, but is preferably 1 to 300 µm, more preferably 20 to 250 µm, furthermore preferably 40 to 200 µm, and particularly preferably 50 to 150 µm.

Assume that the shaped article according to the present invention includes a two-dimensional member as the member. In this case, the hardcoat layer in the present invention may have a thickness not limited, but preferably 0.1 to 1000 µm, more preferably 1 to 500 µm, furthermore preferably 3 to 200 µm, and particularly preferably 5 to 100 µm. When the shaped article includes the hardcoat layer in the present invention disposed on both sides of the two-dimensional member, the term "thickness" refers to the thickness of each hardcoat layer. In particular, the hardcoat layer in the present invention, even when having a small thickness (e.g., a thickness of 5 µm or less), can maintain high surface hardness (e.g., a pencil hardness of H or higher). In contrast, the hardcoat layer can have a large thickness so as to have a significantly higher pencil hardness (e.g., a pencil hardness of 9H or higher). This is because the hardcoat layer, even when having a large thickness (e.g., a thickness of 50 µm or more), less suffers from defects such as cracking caused typically by cure shrinkage.

Assume that the shaped article according to the present invention includes a three-dimensional member as the member. In this case, the thickness of the hardcoat layer in the present invention is not limited, but is preferably 0.1 to 200 µm, more preferably 1 to 150 µm, furthermore preferably 3 to 100 µm, particularly preferably 5 to 80 µm, and especially preferably 10 to 50 µm. In particular, the hardcoat layer in the present invention, even when having a small thickness (e.g., a thickness of 5 µm or less), can maintain high surface hardness (e.g., a pencil hardness of H or higher). In contrast, the hardcoat layer can have a large thickness so as to have a significantly higher pencil hardness (e.g., a pencil hardness of 9H or higher). This is because the hardcoat layer, even when having a large thickness (e.g., a thickness of 50 µm or more), less suffers from defects such as cracking caused typically by cure shrinkage.

The haze of the hardcoat layer in the present invention is not limited, but is preferably 1.5% or less, and more preferably 1% or less, at a thickness of 50 µm. When the shaped article according to the present invention includes the hardcoat layer in the present invention alone, the term "hardcoat layer in the present invention" may be read as "shaped article according to the present invention". The lower limit of the haze is not limited, but is preferably typically 0.1%. In particular, the hardcoat layer, when having a haze of 1% or less, tends to be suitably usable in applications that require extremely high transparency, such as uses as display-surface protecting sheets of touch screens (touch panels). The haze of the hardcoat layer in the present invention may be measured in accordance with JIS K 7136.

The total luminous transmittance of the hardcoat layer in the present invention is not limited, but is preferably 85% or more, and more preferably 90% or more, at a thickness of 50 μm. When the shaped article according to the present invention includes the hardcoat layer in the present invention alone, the term "hardcoat layer in the present invention" just mentioned above may be read as "shaped article according to the present invention". The upper limit of the total luminous transmittance is not limited, but is preferably typically 99%. The hardcoat layer, when having a total luminous transmittance of 85% or more, tends to be suitably usable in applications that require extremely high transparency, such as uses as display-surface protecting sheets of touch screens. The total luminous transmittance of the hardcoat layer in the present invention may be measured in accordance with JIS K 7361-1.

The surface pencil hardness of the hardcoat layer in the present invention of the shaped article according to the present invention is not limited, but is preferably H or higher (e.g., H to 9H), more preferably 2H or higher, furthermore preferably 3H or higher, still more preferably 4H or higher, still furthermore preferably 5H or higher, and particularly preferably 6H or higher. Control of an aging step can give a hardcoat layer having a pencil hardness of 7H or higher (e.g., 7H to 9H), and preferably 8H or higher. The pencil hardness may be evaluated according to the method prescribed in JIS K 5600-5-4.

The haze of the shaped article according to the present invention is not limited, but is preferably 0.05% to 5%, more preferably 0.1% to 3%, furthermore preferably 0.15% to 2%, still more preferably 0.2% to 1%, and particularly preferably 0.3% to 0.8%, at a thickness of 50 μm. The shaped article, when having a haze of 5% or less, tends to be suitably usable in applications that require extremely high transparency, such as uses as display-surface protecting sheets of touch screens. The haze of the shaped article according to the present invention may be measured in accordance with JIS K 7136.

The total luminous transmittance of the shaped article according to the present invention is not limited, but is preferably 70% or more (e.g., 70% to 100%), more preferably 80% or more, furthermore preferably 85% or more, and particularly preferably 90% or more, at a thickness of 50 μm. The shaped article, when having a total luminous transmittance of 70% or more, tends to be suitably usable in applications that require extremely high transparency, such as uses as display-surface protecting sheets of touch screens. The total luminous transmittance of the shaped article according to the present invention may be measured in accordance with JIS K 7361-1.

The hardcoat layer in the present invention has high scratch resistance. The hardcoat layer in the present invention of the shaped article according to the present invention therefore preferably has such a surface as not to be scratched even after 100 reciprocating movements of steel wool #0000 having a diameter of 1 cm under a load of 1.3 kg/cm$^2$.

The hardcoat layer in the present invention has excellent smoothness. The arithmetic mean surface roughness Ra of the hardcoat layer in the present invention of the shaped article according to the present invention is not limited, but is preferably 0.1 to 20 nm, more preferably 0.1 to 10 nm, and furthermore preferably 0.1 to 5 nm. The arithmetic mean surface roughness of the hardcoat layer may be measured in accordance with JIS B 0601.

The surface water contact angle of the hardcoat layer in the present invention of the shaped article according to the present invention is not limited, but is preferably 60° or more (e.g., 60° to 110°), more preferably 70° to 110°, and furthermore preferably 80° to 110°. The hardcoat layer, when having a surface water contact angle of 60° or more, tends to have still better surface scratch resistance.

The shaped article according to the present invention may further include a surface-protecting film on the hardcoat layer in the present invention. The shaped article (in particular, the hardcoat film) according to the present invention, when including such a surface-protecting film, tends to have still better die cutting workability. For example, assume that the hardcoat layer has very high hardness and is susceptible to defects in die cutting, such as separation from the substrate and cracking. Even in this case, the shaped article, when having such a surface-protecting film, can undergo die cutting using a Thomson blade without suffering from these defects.

The surface-protecting film for use herein may be selected from known or common surface-protecting films, is not limited, but may be selected from ones including a plastic film and a pressure-sensitive adhesive layer disposed on the plastic film. Non-limiting examples of the plastic film include plastic films made from plastic materials exemplified typically by polyesters (such as poly(ethylene terephthalate)s and poly(ethylene naphthalate)s), polyolefins (such as polyethylenes, polypropylenes, and cyclic polyolefins), polystyrenes, acrylic resins, polycarbonates, epoxy resins, fluorocarbon resins, silicone resins, diacetate resins, triacetate resins, polyarylates, poly(vinyl chloride)s, polysulfones, polyethersulfones, poly(ether ether imide)s, polyimides, and polyamides. Non-limiting examples of the pressure-sensitive adhesive layer include pressure-sensitive adhesive layers made of one or more of known or common pressure-sensitive adhesives such as acrylic pressure-sensitive adhesives, natural rubber pressure-sensitive adhesives, synthetic rubber pressure-sensitive adhesives, ethylene-vinyl acetate copolymer pressure-sensitive adhesives, ethylene-(meth)acrylate copolymer pressure-sensitive adhesives, styrene-isoprene block copolymer pressure-sensitive adhesives, and styrene-butadiene block copolymer pressure-sensitive adhesives. The pressure-sensitive adhesive layer may include one or more of additives such as antistatic agents and slipping agents. Each of the plastic film and the pressure-sensitive adhesive layer may independently have a single layer structure or a multi-layer structure. The thickness of the surface-protecting film is not limited and may be selected as appropriate.

The surface-protecting film are available from the market as commercial products typically under the trade names of SUNYTECT series (from Sun A. Kaken Co., Ltd.), the trade names of E-MASK series (from Nitto Denko Corporation), the trade names of MASTACK series (from Fujimori Kogyo Co., Ltd.), the trade names of HITALEX series (from Hitachi Chemical Company, Ltd.), and the trade names of ALPHAN series (from Oji F-Tex Co., Ltd.).

The shaped article according to the present invention may be produced typically by applying any of the curable compositions according to the present invention (curable composition for hardcoat layer formation) onto a support or substrate, drying the applied composition to remove the solvent as needed, and curing the curable composition (curable composition layer). Non-limiting examples of the support include the surface-protecting film, the two-dimensional member, and the three-dimensional member. Conditions for curing the curable composition are not limited, and may be selected typically from the conditions for the formation of the cured product.

The curable composition according to the present invention may be applied by a known or common coating technique. Non-limiting examples of a coating device include roll coaters, air-knife coaters, blade coaters, rod coaters, reverse coaters, bar coaters, comma coaters, dip and squeeze coaters, die coaters, gravure coaters, micro-gravure coaters, silk-screen coaters, and spray coaters. Non-limiting examples of the coating technique include techniques using such a coating device; dip techniques (dip coating); and techniques using spinners. Among them, coating with a bar coater or a gravure coater is preferred.

The temperature in drying after the application of the curable composition according to the present invention is not limited, but is preferably 40° C. to 150° C., more preferably 50° C. to 120° C., furthermore preferably 60° C. to 100° C., and particularly preferably 60° C. to 80° C. The drying time is also no limited, but is preferably about 30 seconds to about one hour. To give a hardcoat layer having a pencil hardness approximately equivalent to that of glass, the drying time is preferably 3 minutes or longer (e.g., 3 minutes to one hour), more preferably 5 to 30 minutes, and furthermore preferably 8 to 20 minutes.

The irradiation with the actinic radiation (in particular, electron beams) is preferably performed in an inert gas atmosphere, such as nitrogen atmosphere, argon atmosphere, or helium atmosphere.

The production may further include an aging step after curing of the curable composition according to the present invention to form a hardcoat layer. In the aging step, the formed hardcoat layer is subjected to a heat treatment (annealing treatment). The temperature of heating in the aging step is not limited, but is preferably 30° C. to 200° C., more preferably 50° C. to 190° C., and furthermore preferably 60° C. to 180° C. The heating time is also not limited, but is preferably 10 minutes to 10 hours, more preferably 30 minutes to 5 hours, and furthermore preferably 45 minutes to 3 hours. In particular, to give a hardcoat layer having a pencil hardness approximately equivalent to that of glass, the heating is preferably performed at 30° C. to 150° C. (preferably 50° C. to 120° C., and more preferably 60° C. to 100° C.) for 30 minutes to 5 hours (preferably 1 to 3 hours, and more preferably 1.5 to 2.5 hours).

In particular, the hardcoat layer in the present invention of the shaped article according to the present invention is a hardcoat layer formed from (derived from) the curable composition according to the present invention (curable composition for hardcoat layer formation), which can form a cured product having flexibility and workability at excellent levels. This allows the hardcoat film according to the present invention, which is a shaped article according to the present invention, to be producible through a roll-to-roll process. The hardcoat film, when produced through a roll-to-roll process, can be produced with significantly higher productivity. The method for producing the hardcoat film according to the present invention through a roll-to-roll process may be selected from known or common roll-to-roll production methods, is not limited, but is exemplified typically by a method which includes steps A, B, and C as essential steps and which successively performs these steps A, B, and C. The step A is the step of unwinding and feeding a rolled, wound substrate. The step B is the step of applying the curable composition according to the present invention (curable composition for hardcoat layer formation) to at least one surface of the fed substrate, subsequently, as needed, drying the applied curable composition to remove the solvent, and curing the curable composition (curable composition layer) to form a hardcoat layer in the present invention to thereby give a hardcoat film. The step C is the step of rewinding the resulting hardcoat film into a roll. The method may further include one or more other steps in addition to the steps A, B, and C.

The shaped article according to the present invention is usable as components of various products, and as components of their members or parts. Non-limiting examples of the products include display devices such as liquid crystal displays and organic electroluminescent displays; input devices such as touch screens; solar cells; various household electrical appliances; various electric/electronic products; various electric/electronic products exemplified typically by portable electronic terminals such as game equipment, personal computers, tablet computers, smartphones, and cellular phones; and various optical devices.

The hardcoat layer in the present invention has flexibility while maintaining high hardness. This allows the hardcoat film according to the present invention to be producible and processable through a roll-to-roll process, to thereby have high quality, and to offer excellent productivity. The hardcoat film also has excellent die cutting workability particularly when including the surface-protecting film on the hardcoat layer in the present invention. The hardcoat film is advantageously usable in every use which requires any of these properties. The hardcoat film according to the present invention is also usable typically as a surface-protecting film for various products; and a surface-protecting film for members or parts of various products. In embodiments, the hardcoat film according to the present invention is used as a component of various products, and of their members or parts. For example, in a non-limiting example of these embodiments, the hardcoat film is used in a multilayer assembly in a touch screen, where the multilayer assembly includes the hardcoat film and a transparent conductive film.

The curable compositions according to the present invention are usable not only in uses to give the shaped articles according to the present invention, but also in various uses to give adhesives layers in adhesive sheets, or to give adhesives for the bonding between desired articles (such as parts) with each other.

EXAMPLES

The present invention will be illustrated in further detail with reference to several examples below. It should be noted, however, that the examples are by no means intended to limit the scope of the present invention. Molecular weights of products were measured at 40° C. using Alliance HPLC System 2695 (supplied by Waters Corporation), Refractive Index Detector 2414 (supplied by Waters Corporation), two Tskgel GMH$_{HR}$-M columns (supplied by Tosoh Corporation) as columns, Tskgel guard column H$_{HF}$L (supplied by Tosoh Corporation) as a guard column, COLUMN HEATER U-620 (supplied by Sugai) as a column oven, and THF as a solvent. Mole ratios (T3 to T2 ratios) of T3 species to T2 species in the products were measured by $^{29}$Si-NMR spectrum measurement using JEOL ECA500 (500 MHz). T$_{d5}$ (5% weight loss temperatures) of the products were measured by thermogravimetry (TGA) in an air atmosphere at a rate of temperature rise of 5° C./min.

Example 1

Preparation of Cationically Curable Silicone Resin

In a nitrogen stream, 161.5 mmol (39.79 g) of 2-(3,4-epoxycyclohexyl) ethyltrimethoxysilane (hereinafter referred to as "EMS"), 9 mmol (1.69 g) of phenyltrimethoxysilane (hereinafter referred to as "PMS"), and 165.9 g of acetone were placed in a 300-mL flask (reactor) equipped with a thermometer, a stirrer, a reflux condenser, and a nitrogen inlet tube, followed by temperature rise up to 50° C. The resulting mixture was combined with 4.70 g (1.7 mmol in terms of potassium carbonate) of 5% potassium carbonate aqueous solution added dropwise over 5 minutes, and subsequently combined with 1700 mmol (30.60 g) of water added dropwise over 20 minutes. Significant temperature rise did not occur during the dropwise additions. The mixture was then subjected to polycondensation in a nitrogen stream for 4 hours, while the temperature was held at 50° C.

A product in the reaction solution after the polycondensation was analyzed and found to have a number-average molecular weight of 1911 and a molecular-weight dispersity of 1.47. The product had a T3 to T2 mole ratio of 10.3, where the T3 to T2 mole ratio is the mole ratio of T3 species to T2 species and was calculated from the $^{29}$Si-NMR spectrum of the product.

The reaction solution was then cooled and rinsed until a lower liquid became neutral, an upper liquid was isolated, from which the solvent was distilled off at 40° C. and 1 mmHg. This gave a colorless, transparent liquid product (cationically curable silicone resin including epoxy-containing silsesquioxane units). The product had a $T_{d5}$ of 370° C.

Production of Hardcoat Film

A solution mixture was prepared and used as a hardcoating composition (curable composition). The solution mixture was a mixture of 4.5 parts by weight of the above-prepared cationically curable silicone resin (hereinafter referred to as a "curable resin A"), 0.5 part by weight of an epoxy compound, 1.3 parts by weight of MEK, 0.1 part by weight of a cationic photoinitiator, and 0.05 part by weight of a leveling agent.

The resulting hardcoating composition was applied onto a PET film using a wire bar #30, left stand in an oven at 70° C. for one minute (prebaked), and irradiated with ultraviolet rays at a dose of 400 mJ/cm for 5 seconds, using a high-pressure mercury lamp (supplied by Eye Graphics Co., Ltd.). The article was subjected to a heat treatment (aging treatment) at 15° C. for one hour to cure the coated layer of the hardcoating composition. This gave a hardcoat film including a hardcoat layer.

Examples 2 to 4 and Comparative Example 1

Hardcoating compositions were prepared by a procedure similar to that in Example 1, except for employing different formulae of the hardcoating compositions (curable compositions) and different thicknesses of hardcoat layers as given in Table 1. Hardcoat films were produced by a procedure similar to that in Example 1, except for using these hardcoating compositions and forming hardcoat layers having different thicknesses as given in Table 1. In Table 1, proportions of starting materials to form the curable compositions are expressed in part by weight.

Example 5

Preparation of Cationically Curable Silicone Resin

In a nitrogen stream, 161.5 mmol (39.79 g) of EMS, 9 mmol (1.69 g) of PMS, and 165.9 g of acetone were placed in a 300-mL flask (reactor) equipped with a thermometer, a stirrer, a reflux condenser, and a nitrogen inlet tube, followed by temperature rise up to 50° C. The resulting mixture was combined with 4.70 g (1.7 mmol in terms of potassium carbonate) of 5% potassium carbonate aqueous solution added dropwise over 5 minutes, and subsequently combined with 1700 mmol (30.60 g) of water added dropwise over 20 minutes. Significant temperature rise did not occur during the dropwise additions. The mixture was then subjected to polycondensation in a nitrogen stream for 4 hours, while the temperature was held at 50° C.

A product in the reaction solution after the polycondensation reaction was analyzed and found to have a number-average molecular weight of 1799 and a molecular-weight dispersity of 1.57. The product had a T3 to T2 mole ratio of 10.1, as calculated from the $^9$Si-NMR spectrum of the product.

The reaction solution was then cooled and rinsed until a lower liquid became neutral, an upper liquid was isolated, from which the solvent was distilled off at 40° C. and 1 mmHg. This gave a colorless, transparent liquid product (cationically curable silicone resin including epoxy-containing silsesquioxane units). The product had a $T_{d5}$ of 370° C.

Production of Hardcoat Film

A solution mixture was prepared and used as a hardcoating composition (curable composition). The solution mixture was a mixture of 4.5 parts by weight of the above-prepared cationically curable silicone resin (hereinafter referred to as "curable resin B"), 0.5 part by weight of an epoxy compound, 0.05 part by weight of a cationic photoinitiator, and 0.05 part by weight of a leveling agent.

The resulting hardcoating composition was applied onto a PET film using a wire bar #30, left stand in an oven at 70° C. for one minute (prebaked), and subsequently irradiated with ultraviolet rays at a dose of 400 mJ/cm$^2$ for 5 seconds using a high-pressure mercury lamp (supplied by Eye Graphics Co., Ltd.). The article was then subjected to a heat treatment (aging treatment) at 15° C. for one hour to cure the coated layer of the hardcoating composition. This gave a hardcoat film including a hardcoat layer.

Examples 6 and 7 and Comparative Example 2

Hardcoating compositions were prepared by a procedure similar to that in Example 5, except for employing different formulae of the hardcoating compositions (curable compositions) and different thicknesses of hardcoat layers as given in Table 1. Hardcoat films were produced by a procedure similar to that in Example 5, except for using the above-prepared hardcoating compositions and forming hardcoat layers having different thicknesses as given in Table 1. In Table 1, the proportions of starting materials to form the curable compositions are expressed in part by weight.

Examples 8 to 13 and Comparative Examples 3 to 7

Hardcoating compositions were prepared by a procedure similar to that in Example 1, except for employing different formulae of the hardcoating compositions (curable compositions) and different thicknesses of hardcoat layers as given in Table 2. Hardcoat films were produced by a procedure similar to that in Example 1, except for using the above-prepared hardcoating compositions and forming hardcoat layers having different thicknesses as given in Table 2. The polyorganosilsesquioxanes obtained in Examples 8 to 13 were subjected to FT-IR spectrum measurements by the method and were each found to give one intrinsic absorption peak at around 1100 cm$^{-1}$. In Table 2, the proportions of starting materials to form the curable compositions are expressed in part by weight.

The above-prepared hardcoat films were evaluated for following properties by methods as follows. The results are presented in Tables 1 and 2.

(1) Bend Test (Cylindrical Mandrel): Through Mandrel Test

Each of the above-prepared hardcoat films was evaluated by a bend test in accordance with JIS K 5600-5-1, using cylindrical mandrels. The results are presented in "Mandrel test (mm)" in Tables 1 and 2.

(2) Surface Hardness (Pencil Hardness)

The hardcoat layer surface pencil hardness of each of the prepared hardcoat films was evaluated in accordance with JIS K 5600-5-4. Evaluation was performed three times, and a hardest result was defined as the evaluation result. The results are presented in "Pencil hardness" in Tables 1 and 2.

TABLE 1

| | | Comp. Ex. 1 | Example 1 | Example 2 | Example 3 | Example 4 | Comp. Ex. 2 | Example 5 | Example 6 | Example 7 |
|---|---|---|---|---|---|---|---|---|---|---|
| Curable composition | Weight ratio of cationically curable silicone resin to epoxy compound | 100:0 | 90:10 | 90:10 | 90:10 | 90:10 | 100:0 | 90:10 | 80:20 | 70:30 |
| | Cationically curable silicone resin — Curable resin A | 5 | 4.5 | 4.5 | 4.5 | 4.5 | | | | |
| | Curable resin B | | | | | | 5 | 4.5 | 4 | 3.5 |
| | Epoxy compound — CELLOXIDE 2021P | | 0.5 | | | | | 0.5 | 1 | 1.5 |
| | Epoxy compound A EHPE 3150 | | | 0.5 | | | | | | |
| | Epoxy compound B | | | | 0.5 | | | | | |
| | | | | | | 0.5 | | | | |
| | Solvent — MEK | | 1.3 | | | | | | | |
| | Cationic photoinitiator — WPI-124 | 0.1 | 0.1 | 0.1 | 0.1 | 0.1 | 0.05 | 0.05 | 0.05 | 0.05 |
| | Leveling agent — Surflon S-243 | 0.05 | 0.05 | 0.05 | 0.05 | 0.05 | 0.05 | 0.05 | 0.05 | 0.05 |
| Hardcoat layer | Thickness (μm) | 51 | 49 | 56 | 50 | 50 | 31 | 32 | 34 | 37 |
| | Mandrel test (mm) | 32 | 20 | 20 | 16 | 20 | 25 | 16 | 16 | 20 |
| | Pencil hardness | 4H | 9H | 8H | 8H | 9H | HB | 8H | 8H | 8H |

TABLE 2

| | | | Example 8 | Example 9 | Example 10 | Example 11 | Example 12 | Example 13 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|---|
| Curable composition | Cationically curable silicone resin | Curable resin A | 100 | 100 | 100 | 100 | 100 | 100 | 100 | | | | |
| | Curable resin | PETIA | | | | | | | | 100 | | | |
| | | IRR214K | | | | | | | | | 100 | | |
| | | TA-100 | | | | | | | | | | 100 | |
| | | SI-20 | | | | | | | | | | | 100 |
| | Acrylic ester resin | SG-600TEA | 1 | 5 | 10 | | | | | | | | |
| | | SG-280 EK23 | | | | 5 | | | | | | | |
| | | SG-P3 | | | | | 5 | 10 | | | | | |
| | Cationic photoinitiator | WPI-124 | 1 | 1 | 1 | 1 | 1 | 1 | 1 | | | | |
| | | Curing catalyst A | | | | | | | | | | 3 | 3 |
| | | IRGACURE 184 | | | | | | | | 5 | 5 | | |
| | Leveling agent | Surflon S-243 | 0.5 | 0.5 | 0.5 | 0.5 | 0.5 | 0.5 | 0.5 | | | | |
| Hardcoat layer | Thickness (μm) | | 30 | 30 | 30 | 30 | 30 | 30 | 30 | 35 | 32 | 40 | 37 |
| | Mandrel test (mm) | | 20 | 20 | 20 | 20 | 3 | 3 | 16 | ≥32 | ≥32 | ≥32 | ≥32 |
| | Pencil hardness | | 9H | 9H | 9H | 8H | 5H | 5H | 5H | 3H | H | 2H | 2H |

The abbreviations given in Tables 1 and 2 stand for as follows.
Epoxy Compound
CELLOXIDE 2021P: trade name CELLOXIDE 2021P (3,4-epoxycyclohexylmethyl (3,4-epoxy)cyclohexanecarboxylate), supplied by Daicel Corporation
Epoxy compound A: bis(3,4-epoxycyclohexylmethyl) ether
EHPE 3150: trade name EHPE 3150 (1,2-epoxy-4-(2-oxiranyl)cyclohexane adduct of 2,2-bis(hydroxymethyl)-1-butanol), supplied by Daicel Corporation
Epoxy compound B: 2,2-bis(3,4-epoxycyclohexylmethyl) propane
Solvent
MEK: methyl ethyl ketone
Curable Resin
PETIA: a mixture of pentaerythritol triacrylate and pentaerythritol tetraacrylate, trade name PETIA (supplied by DAICEL-ALLNEX LTD.)
IRR214K: tricyclodecanedimethanol diacrylate, trade name IRR214K (supplied by DAICEL-ALLNEX LTD.)
TA-100: an acrylic silicone resin, trade name SQ TA-100 (supplied by Toagosei Co. Ltd.)
SI-20: an acrylic silicone resin, trade name SQ SI-20 (supplied by Toagosei Co. Ltd.)
Acrylic Ester Resin
SG-600 TEA: an acrylate copolymer (containing OH groups as functional groups), trade name SG-600 TEA (supplied by Nagase ChemteX Corporation)
SG-280 EK23: an acrylate copolymer (containing COOH groups as functional groups), trade name SG-280 EK23 (supplied by Nagase ChemteX Corporation)
SG-P3: an acrylate copolymer (containing epoxy groups as functional groups), trade name SG-P3 (supplied by Nagase ChemteX Corporation)
Cationic Photoinitiator
WPI-124: trade name WPI-124, supplied by Wako Pure Chemical Industries, Ltd., a 50% solution of a photoacid generator
Curing catalyst A: a 50% solution of [4-(4-biphenylthio) phenyl]-4-biphenylphenylsulfonium tris(pentafluoroethyl) trifluorophosphate in propylene glycol methyl ether acetate
Irgacure 184: a photoinitiator, trade name IRGACURE 184 (supplied by BASF Japan Ltd.)
Leveling Agent
Surflon S-243: trade name Surflon S-243, an ethylene oxide adduct of a fluorine compound, supplied by AGC Seimi Chemical Co., Ltd.

As presented in Table 1, the hardcoat films according to the present invention (Examples 1 to 7) each have higher surface hardness and still offer better flexibility and better workability, as compared with the hardcoat films according to Comparative Examples 1 and 2, each of which is a laminate including a hardcoat layer derived from a curable composition devoid of epoxy compounds.

As presented in Table 2, the hardcoat films according to the present invention (Examples 8 to 11) each maintain higher flexibility and still have, in particular, higher surface hardness, as compared with the hardcoat films according to Comparative Examples 3 to 7, each of which is a laminate including a hardcoat layer derived from a curable composition devoid of (meth)acrylate resins. Also as indicated in Table 2, the hardcoat films according to the present invention (Examples 12 and 13) each maintain higher surface hardness and still offer, in particular, higher flexibility, as compared with the hardcoat films according to Comparative Examples 3 to 7, each of which is a laminate including a hardcoat layer derived from a curable composition devoid of (meth)acrylate resins.

INDUSTRIAL APPLICABILITY

The curable compositions according to the present invention, when cured, offer high flexibility and high surface hardness, have heat resistance and workability at excellent levels, and are applicable, in particular, as curable compositions for the formation of hardcoat layers. The shaped articles according to the present invention are usable typically as components of various products and of their members or parts, where the products are exemplified typically by, but not limited to, display devices such as liquid crystal displays and organic electroluminescent displays; and input devices such as touch screens.

The invention claimed is:
1. A curable composition comprising:
a cationically curable silicone resin;
an epoxy compound other than the cationically curable silicone resin; and
a leveling agent,
the cationically curable silicone resin being a silicone resin comprising a silsesquioxane unit,
the silicone resin comprising an epoxy-containing constitutional unit in a proportion of 50 mole percent or more of the totality of siloxane constitutional units in the cationically curable silicone resin,
the silicone resin having a number-average molecular weight of 1000 to 3000,
the cationically curable silicone resin comprising a constitutional unit represented by Formula (I) in a proportion of 50 mole percent or more of the totality of siloxane constitutional units in the cationically curable silicone resin, Formula (I) expressed as follows:

$[R^a SiO_{3/2}]$ (I)

wherein $R^a$ is selected from an epoxy-containing group, a hydrocarbon group, and hydrogen,
the cationically curable silicone resin further comprising a constitutional unit represented by Formula (II):

$[R^b SiO_{2/2}(OR^c)]$ (II)

wherein $R^b$ is selected from an epoxy-containing group, a hydrocarbon group, and hydrogen; and $R^c$ is selected from hydrogen and $C_1$-$C_4$ alkyl, and
the cationically curable silicone resin having a mole ratio of the constitutional unit represented by Formula (I) to the constitutional unit represented by Formula (II) of 5 or more.

2. The curable composition according to claim 1, wherein the epoxy compound is a cycloaliphatic epoxy compound.

3. The curable composition according to one of claims 1 and 2,
wherein the epoxy compound is a compound containing a cyclohexane oxide group.

4. A curable composition comprising:
a cationically curable silicone resin;
a (meth)acrylate resin containing at least one group selected from the class consisting of hydroxy, carboxy, and epoxy; and
a leveling agent,
the cationically curable silicone resin comprising a silsesquioxane unit as a monomeric constitutional unit, the cationically curable silicone resin comprising an epoxy-containing monomeric unit in a proportion of 50 mole percent or more of the totality of all monomeric units, the cationically curable silicone resin having a number-average molecular weight of 1000 to 3000.

5. The curable composition according to claim 4, wherein the (meth)acrylate resin is present in a proportion of 0.1 to 20 parts by weight per 100 parts by weight of the cationically curable silicone resin.

6. The curable composition according to claim 4, wherein the cationically curable silicone resin comprises a constitutional unit represented by Formula (I) in a proportion of 50 mole percent or more of the totality of siloxane constitutional units in the cationically curable silicone resin, Formula (I) expressed as follows:

[Chem. 1]

$$[R^a SiO_{3/2}] \qquad (I)$$

wherein $R^a$ is selected from an epoxy-containing group, a hydrocarbon group, and hydrogen.

7. The curable composition according to claim 6, wherein the cationically curable silicone resin further comprises a constitutional unit represented by Formula (II):

[Chem. 2]

$$[R^b SiO_{2/2}(OR^c)] \qquad (II)$$

wherein $R^b$ is selected from an epoxy-containing group, a hydrocarbon group, and hydrogen; and $R^c$ is selected from hydrogen and $C_1$-$C_4$ alkyl, and wherein the cationically curable silicone resin has a mole ratio of the constitutional unit represented by Formula (I) to the constitutional unit represented by Formula (II) of 5 or more.

8. The curable composition according to claim 1 or 4, wherein the silsesquioxane unit comprises, in combination:
a constitutional unit represented by Formula (1); and
a constitutional unit represented by Formula (2),
Formulae (1) and (2) expressed as follows:

[Chem. 3]

$$[R^1 SiO_{3/2}] \qquad (1)$$

wherein $R^1$ represents a cycloaliphatic-epoxy-containing group,

[Chem. 4]

$$[R^2 SiO_{3/2}] \qquad (2)$$

wherein $R^2$ represents optionally substituted aryl.

9. The curable composition according to claim 1 or 4, wherein the cationically curable silicone resin has a molecular-weight dispersity (ratio of weight-average molecular weight to number-average molecular weight) of 1.0 to 3.0.

10. The curable composition according to claim 1 or 4, wherein the leveling agent is at least one leveling agent selected from the class consisting of:
silicone leveling agents; and
fluorine-containing leveling agents, and
wherein the leveling agent contains at least one group selected from the class consisting of:
epoxy-reactive groups; and
hydrolytically condensable groups.

11. A shaped article comprising
a hardcoat layer made of a cured product of the curable composition according to claim 1 or 4.

* * * * *